(12) United States Patent
Oon

(10) Patent No.: US 6,408,266 B1
(45) Date of Patent: Jun. 18, 2002

(54) DIDACTIC AND CONTENT ORIENTED WORD PROCESSING METHOD WITH INCREMENTALLY CHANGED BELIEF SYSTEM

(76) Inventor: Yeong Kaung Oon, 29 Darryl Street, Scoresby Vic 3179 (AU)

(*) Notice: Subject to any disclaimer, the term of this patent is extended or adjusted under 35 U.S.C. 154(b) by 0 days.

(21) Appl. No.: 09/402,175
(22) PCT Filed: Mar. 31, 1998
(86) PCT No.: PCT/AU98/00220
§ 371 (c)(1), (2), (4) Date: Sep. 29, 1999
(87) PCT Pub. No.: WO98/44432
PCT Pub. Date: Oct. 8, 1998

(30) Foreign Application Priority Data

Apr. 1, 1997 (AU) .............................. P05935
Mar. 20, 1998 (AU) .............................. PP2462

(51) Int. Cl.[7] ................................................ G06F 17/20
(52) U.S. Cl. ...................................... 704/1; 707/531
(58) Field of Search .................. 704/1, 9, 10; 707/530, 707/531, 532; 434/156, 167, 169

(56) References Cited

U.S. PATENT DOCUMENTS

| | | | | |
|---|---|---|---|---|
| 4,731,021 A | * | 3/1988 | Cahn .......................... | 434/156 |
| 4,773,039 A | | 9/1988 | Zamora ....................... | 707/540 |
| 5,056,021 A | * | 10/1991 | Ausborn ....................... | 704/9 |
| 5,579,466 A | | 11/1996 | Habib et al. ................. | 707/529 |
| 5,694,610 A | | 12/1997 | Habib et al. ................. | 707/531 |
| 5,724,594 A | * | 3/1998 | Pentheroudakis ............. | 704/10 |
| 5,832,470 A | * | 11/1998 | Morita et al. ................. | 707/1 |
| 5,999,940 A | * | 12/1999 | Ranger ........................ | 707/103 |
| 6,012,075 A | * | 1/2000 | Fein et al. .................... | 707/540 |
| 6,061,675 A | * | 5/2000 | Wical .......................... | 706/45 |
| 6,182,062 B1 | * | 1/2001 | Fujisawa et al. .............. | 707/3 |

FOREIGN PATENT DOCUMENTS

EP  0 361 570  4/1990

* cited by examiner

*Primary Examiner*—Patrick N. Edouard
(74) *Attorney, Agent, or Firm*—Cohen, Pontani, Lieberman & Pavane

(57) ABSTRACT

A method of implementing a didactic and content oriented word processor analysis of displayed text based upon a unified belief system of linguistic space, which space comprises words, phrases, individual sentences and/or other text. The analysis utilizes protocols defined by means for parsing and paraphrasing text, means for varied diction methods, means for solving word puzzles and means for user incremental change of the belief system, and includes the steps of: (a) selecting text displayed on a video display; (b) displaying on the video display at least one query box relating to one or more of the protocols and screens associated therewith; (c) selecting one or more of the protocols; (d) running the selected one or more protocols; and (e) displaying on the video display a text edit area adapted to receive the output of step (d).

14 Claims, 24 Drawing Sheets

Example: *rubbish*

| KEY | COMPUTER OBJECT/RECORD |
|---|---|
| rubbish | |

| | |
|---|---|
| Kingdom | : word |
| Phylum | : literal |
| Subphylum | : words |
| Superclass | : Middle English |
| Class | : noun |
| Subclass | : nil |
| Order | : nil |
| Family | : dD (iambic) |
| Genus | : dross nonsense |
| Subgenus | : robishe |
| Superspecies | : nil |
| Species | : rubbish |
| | |
| synonym | : trash, dross, refuse, litter, rubble, waste, garbage |
| antonym | : treasure, valuable, gem |
| literal meaning | : unwanted things to be thrown away |
| abstract meaning | : nonsense |
| | |
| pronunciation | : ru~b~ish |

FIG.1.

Example: *go between*

KEY
go between

COMPUTER OBJECT/RECORD

| | |
|---|---|
| Kingdom | : word |
| Phylum | : abstract |
| Subphylum | : phrases |
| Superclass | : nil |
| Class | : nil |
| Subclass | : prose |
| Order | : metaphor |
| Family | :ddD (anapaestic) |
| Genus | : intermediary |
| Subgenus | : nil |
| Superspecies | : nil |
| Species | : go between |
| synonym | : broker, intermediary, matchmaker |
| antonym | : nil |
| literal meaning | : nil |
| abstract meaning | : broker |
| pronunciation | : go bi~tw~en |

FIG. 2.

Example: *A rolling stone gathers no moss*

KEY
A rolling stone gathers no moss

COMPUTER OBJECT/RECORD

| | |
|---|---|
| Kingdom | : word |
| Phylum | : abstract, prose |
| Subphylum | : sentences |
| Superclass | : nil |
| Class | : nil |
| Subclass | : nil |
| Order | : proverb |
| Family | : dDdDdDdD |
| Genus | : rolling, stone, moss, persistence, opportunity, drifter |
| Subgenus | : nil |
| Superspecies | : nil |
| Species | : a rolling stone gathers no moss |
| synonym | : drifter |
| antonym | : nil |
| literal meaning | : nil |
| abstract meaning | : lack of persistence leads to failure |
| pronunciation | : |

An excerpt from the speech by Rev. Martin Luther King, Jr., in Washington, D.C., in 1963:
*I have a dream that one day on the red hills of Georgia the sons of former slaves and the sons of former slaveowners will be able to sit down together at the table of brotherhood. I have a dream that one day even the state of Mississippi, a state sweltering with the heat of oppression, will be transformed into an oasis of freedom and justice.*

| KEY |
| ihadtodo |

| COMPUTER OBJECT/RECORD | |
|---|---|
| Kingdom | : word |
| Phylum | : literal, prose |
| Subphylum | : text |
| Superclass | : nil |
| Class | : speech |
| Subclass | : nil |
| Order | : nil |
| Family | : nil |
| Genus | : black, white, dream, Martin Luther, freedom, justice |
| Subgenus | : nil |
| Superspecies | : nil |
| Species | : ihadtodo |
| synonym | : nil |
| antonym | : nil |
| literal meaning | : nil |
| abstract meaning | : nil |
| pronunciation | : |

FIG. 4.

DIDACTIC AND CONTENT ORIENTED WORD PROCESSING METHOD WITH INCREMENTALLY CHANGED BELIEF SYSTEM

FIELD OF THE INVENTION

The invention relates to the method of word processing.

BACKGROUND OF THE INVENTION

In the main, present day word processing techniques produce documents that are designed for appearance, where appearance equates with success. They downgrade the reality and exalts form and discards substance. The present day word processor is a big leap forward compared to the typewriter, with features such as saving the file on disk, spell check and grammar check. They produce stylish documents with a wide array of fonts, but provide no help in the matter of content, specifically in the generation of elegant verse and the appropriate use of rhymes, metaphors and other idiomatic constructs. Present day word processing techniques do not help with the substance or actual content of a document by the provision of parsing functions (other than spelling and grammar,) and provides no array of diction functions for words, phrases, sentences or text to overcome the writing block. Given equal linguistic abilities, a user with a prior art word processor has more or less the same chance as say his compatriot, utilising a conventional typewriter, to have his letter published in the letters column of the daily newspaper. This present invention is designed to help the student, the author or the budding poet find the right word or expression for his ideas and maintain the music in his verse—as it does meter analysis of the text.

Perhaps the chief weakness of present day word processing techniques is that it is in essence a non plastic entity as it does not have a computer model of a unified linguistic belief system about language. It does not integrate and represent the growth in linguistic space (for definition see glossary) of the user. Present day word processing techniques do not create an environment whereby the linguistic space of the user, as he develops in the linguistic sense say for example a student from grade 2 to a pre-university student, is captured and encapsulated in the belief system of the word processor.

Present day word processing techniques are not designed to capture the essence and meaning of new words, idioms, verse, prose, letters, essays that the user may encounter or generates himself. In this invention, any input into the word processing technique is logged and can be integrated into the belief system of this word processing technique. This augmented belief system can then be brought to bear on the parsing/diction problem at the next iteration of use of the word processing technique.

Rather than concentrate on the form or appearance of documents, this didactic word processing technique concentrates on the substance or content of the document being read (parsed) or written. It is described as didactic as it is designed to help the student master the meaning, structure, rhythm and idiom of the language, in addition to saving up everything he has learnt and any literary output he has produced by incorporation into the belief system of the invention.

This word processing technique enables the user, such as an emergent language student. working from a text edit area called the word bench, 1) to parse and translate difficult textual passages from an idiomatic form to its literal form, or from one literal form into another 2) to write better, through improved diction methods for words, phrase, individual sentences, verse and prose and 3) problem solving of word puzzles and 4) Incrementally change the belief system by the addition of new words, phrases, sentences or documents. While the invention discusses the word processing technique implementation for the English language. the system and method is applicable to all alphabetic based languages such as French, German, Pinyin and Bahasa Malaysia etc.

An ideal word processing technique should have the means to 1) to parse a textual passage and explain both the literal meanings and meanings of idiomatic expressions embedded in the text 2) to write better English by providing the user, such as an emergent language student, a rich array of diction methods operating on the belief system, to provide the right word or expression for the occasion 3) didactic function of building an intimacy with English, especially its idiom, by providing the means to solve crossword puzzles and solving problems associated with word games such as hangman and Scrabble (trademark of its respective owner).

Word games such as crossword puzzles, anagrams and Scrabble are popular recreations, an efficient method to solve word puzzles will save countless billions of potentially valuable hours and 4) allow the user to add a part of or all his literary output to be incorporated into the belief system of the word processing technique 5) allow the user to add words, phrases, proverbs or any figure of speech, literary gems from one line to many thousands of lines to be incorporated into the belief system of the word processing technique.

The ideal word processing technique should solve four types of problems of the following nature 1)reading comprehension problem (parsing) 2)writing problem of the diction type 3)intimacy with the language problem that acts as impediment to solving word game puzzles 4) dynamic incremental addition to the belief system of the word processing technique to include user's own literary work to the extent of the users entire lifetime opus, and literary gems produced by others.

The following details the ideal word processing technique as follows:

1) Reading or comprehension (parsing) Problem

Current word processing techniques are not designed from the viewpoint of helping the emergent student of English to read and comprehend a document—the only exception being grammar checking. Current word processing techniques do not help build an intimacy with the language in the areas of rhythm(metrical analysis) rhyme, metaphor and other idiom processing. There exists a large pool of emergent readers and writers in our schools, and a large pool of students of English as a second language who are baffled by the English text documents. These documents may be printed on paper or computer documents downloaded from the Internet or held on disks. The difficulty may be individual words or more often the greater difficulty is that of coping with the English idiom. The English idiom can be perplexing for the newcomer to English and also to the computer parser in attempting to 'understand' English. For instance the phrase 'on ice' can mean literally on ice such as standing in the Antarctic or it may mean 'in limbo'. In multicultural societies like Australia, Canada and the United States—the migrants who have adopted English as a second language often have difficulty expressing themselves. The problem is inappropriate or lack of idiom and the general lack of a congruent meter (rhythm) to their writing. Often the newcomer to English misses out on the subtlety of alliteration and assonance, thereby choosing the wrong word for the occasion. The glaring weakness is in the province of idiom. The components of idiom causing difficulties for the student may be metaphors, similes metonymy, proverbs or other figures of speech. This content oriented word processing technique helps the student develop intimacy with the language and master the idiom of, in this instance the English language. This invention does so by provision of support for parsing of computer text documents to explain underlying idiom and provision of diction methods to help the user deploy the correct words and idioms in his writing.

Writing Problem—Diction Difficulties

Current word processing techniques are designed to produce nice documents. Often it incorporates a spelling checker and may offer some advice on grammar. For the emergent writer it is hard to get started as there is no ready source of words, metaphors or suitable text to get him or her started. With the content oriented word processing technique suggestion of words and commonly used idiomatic expressions comprising the popular metaphors are proffered by use of a attribute (see genus) search or alternative diction strategies enumerated below. For example if the user wishes to use an idiomatic expression with attribute 'suspend' then idioms such as on ice and 'in cold storage' will be displayed.

Diction is the choice of the right word phrase or text for the occasion. In an ideal system, there is a rich array of diction methods producing list of candidate terms. In an ideal system, the diction methods are based on meaning, antonym, synonym, rhyme, meter and combinations of various attributes(eg get me a proverb with an attribute stone get me a metaphor with attribute cat and related metaphors). In an ideal system, there is also a repository function, where the user can store and retrieve favourite stock expressions. quotations or other literary gems. In an ideal system, this repository is not just a mere database but a belief system, it means that the data are all related to one another in a meaningful way, and meaning is arrived at from relationships and inferences. In the above example about retrieving a metaphor with attribute cat, a system with a belief system should return metaphors which contain words such as 'feline' 'pussy' 'Cheshire' and 'kitty'. In sonic schools, children are taught to collect such English expressions in a book titled "My Golden Treasury" or equivalent. Such a function will be useful for junior school students with their notebook computers. They can have a longitudinal record of everything they have written and every gem they have encountered and wish to save. In this instance the words and expressions are saved and incorporated in the belief system, augmenting the power of the word processing technique to process words and expressions.

Writing and reading are concurrent iterative and alternative processes. As reading/parsing and writing are intimately connected, at any stage the student can select any word(s) or idiomatic expression(s) and get the content oriented word processing technique to explain the meaning of the words or idiomatic expressions if he has any doubt about what he has written.

3) Intimacy with the language problem—solving word puzzles.

Crossword puzzles and word games such as Scrabble (trademark of its respective owner) help build intimacy with the language. The ideal word processing technique solves crossword and word game puzzles by virtue of its belief system spanning words, phrases, individual sentences and text. It is par excellent as a trainer for any word games. This intimacy with the language can be built up by the powerful word and phrase retrieval capability comprising attribute search, diction methods, pattern matching and its anagram method. In such an ideal system, the anagram method works two ways—it can build subwords derived from a given string of characters or it can be given a phrase and it will generate a series of words whereby all the characters in the words are used to make up a new phrase utilising the exact characters in the test string. As an example the phrase 'Able was I' can generate the complete anagram cum palindrome of 'I saw elba'. Playing with word puzzles help with developing a command of the language.

4) The ideal word processing technique needs a belief system that is pervasive—words. phrases, individual sentences and text—and plastic (in the changeable sense). Incremental adding, to the belief system of the word processing technique as a logging process of every literary gem the user encounters or the user has produced to the extent that the entire lifetime literary output and its learning process can be logged. This is an intriguing concept to the educator. This means that every document that the writer has produced is no longer scattered as files in different folders. As the various documents are integrated into the belief system of the word processing technique they are all immediately 'active' and can be retrieved by a multitude of diction search methods within the word processing technique. The problem with current day word processing technique is that they lack a coherent plastic belief system to span all linguistic objects. Current word processing techniques do not keep track of the words, phrases, quotations, verses and text that the user has encountered and enjoyed; that keeping track of everything learnt in a belief system will enable a better document to be produced in the next iteration of use.

Traditional word processing techniques (up to March 1997) are effective on the form and presentation of the document. This is explained by the developmental origins of the word processor, it was designed as a productivity tool that was a natural progression from the manual typewriter to overcome technical efficiency problems of formatting, printing of visually appealing documents and storage of documents already typed out. Whereas this invention deals with the content or substance of a document, rather than its form. It addresses the wider issues of competency in the English language. Literacy surveys show that even after twelve years of schooling, up to a fifth of students are problematic with reading. Students adopting English as a second language and preparatory school children are initially problematic readers. If reading is problematic then writing is equally a challenging problem. For these people who have these reading and writing problems. traditional word processing techniques that are mere word editors are not designed to help the student of English to read and write better. The invention here downgrades the problems of producing a technically good looking document and focuses on helping the user understand and write better English verse/prose at both a literal and idiomatic level when using a word processor.

SUMMARY OF THE INVENTION

To address the real limitations of current day word processing techniques, the present invention solves the previously enumerated problems and provides for 1)parsing of documents based on an underlying belief system, providing literal translation of idiom, literal to literal translation 2)wide array of diction methods for words, phrases, sentences and text based on an underlying belief system 3) word problem solving based on underlying, belief system 4) dynamic incremental addition to and augmentation of the belief system of the word processing technique exploiting the concept of learning as an iterative process.

Accordingly there is provided, a method of implementing a didactic and content oriented word processor analysis of displayed text based upon a unified belief system of linguistic space which space comprises words, phrases, individual sentences and/or other text, the analysis utilising protocols defined by means for parsing and paraphrasing text, means for varied diction methods and means for solving word puzzles, including the steps of:

(a) selecting text displayed upon a video display;

(b) displaying on the video display at least one query box relating to one or more of the protocols and screens associated therewith;

(c) selecting one or more of the protocols;

(d) running the selected one or more protocols; and (e) displaying on the video display a text edit area adapted to receive the output of step (d).

The belief system is a multi-level hierarchy, it is similar to the linnean biological system, vet transcends the latter through the multiple inheritance features This classification system of linguistic space is also valid as a non-computer exercise. The linguistic space comprising words, phrases, sentences and text are defined as being at the species level, are classified in a multilevel hierarchy of the linnean biological type. with a single taxon the level of kingdom and taxa at the levels of phylum, subphylum. superclass, class, subclass, order, family, genus, superspecies and species; wherein the possibility exists to introduce more levels such as subclass, suborder, subfamily, subgenus and subspecies, as the need arises. Based on this continually augmented belief system of the invention, diction methods are enhanced to help the user in the creation of higher quality word processed content in an iterative process.

This improved word processing technique starts from a unified belief system for linguistic space, here defined as comprising words, phrases, individual sentences and text. This belief system is modelled on a multilevel hierarchy with multiple inheritance, with a close kinship to, but exceeding the complexity of, the biological Linnean model. Predicated on this belief system, this word processor has means for parsing and paraphrasing text documents, means for varied diction methods for words, phrases, sentences, verse and prose means for solving word puzzles and means for the user to incrementally add to the belief system in order that the word processing technique is augmented, creating a powerful cycle of mutual man-machine learning and teaching, and in this iterative process the quality of the literary output of the word processing technique is fostered. This iterative man-machine learning happens this way. Utilising the same belief system for linguistic space that has been created; new words, phrases, sentences and text are routinely added to the original belief system to augment the diction capabilities of the word processing technique. Each newly added linguistic object has the same functionality of an equivalent linguistic object belonging to the original belief system. In this invention, the belief system is totally plastic and designed to incorporate every word, phrase, sentence or text created or selected by the user. Theoretically, no word/phrase/sentence/text that the user wishes to retain will need to be retyped again or forgotten while in the environment of this word processing technique. For example, a primary school student, issued with a notebook computer utilising this invention, can progress from his grade, to the end of his university course, incrementally adding to the belief system of this invention. He would have at the end of the day, on line integrated into the word processor, every word, every phrase, every sentence, every essay that he has written or any literary gem he fancied, to keep for total recall and comparison. That includes: words, idiomatic expressions, metaphors, proverbs. quotations, verse, prose such as letters and essays.

Rather than concentrate on the form or appearance of documents, this didactic word processing technique concentrates on the substance or content of the document being read (parsed) or written. It is described as didactic as it is designed to help the student master the meaning, structure, rhythm and idiom of the language. The utility is enhanced by the incremental logging of any learned or self created literary material into this homogenous Linnean linguistic belief system of the invention.

This word processing technique enables the user, such as an emergent language student, working from a text edit area called the word bench, 1) to parse and comprehend difficult textual passages and explain both the literal meanings and meanings of idiomatic expressions embedded in the text 2) to write better English by providing the user, such as an emergent language student, a rich array of diction methods operating on the belief system, to provide the right word, sentence phrase, verse or prose for the occasion 3) didactic function of building an intimacy with English, especially its idiom, by providing the means to solve crossword puzzles and solving problems associated with word games such as hangman and Scrabble (trademark of its respective owner). Word games such as crossword puzzles, anagrams and Scrabble are popular recreations, an efficient method to solve word puzzles will save countless potentially valuable hours 4) incrementally log all new linguistic objects to augment the belief system of the word processing technique, the changed belief system then makes available for the future the new words, phrases, sentences or documents via the same diction methods operating on the belief system. While the invention discusses the word processing technique implementation for the English language, the system and method is applicable to all alphabetic based languages such as French, German, Pinyin and Bahasa Malaysia etc.

Therefore this invention solves at least four types of problems of the following nature 1) reading comprehension problem (parsing) 2) writing problem—diction difficulties for words, phrases, sentences, text 3) intimacy with the language problem that acts as impediment to solving word game puzzles and effective writing 4) forgetting linguistic elements that has been learnt or produced—problem solved by incrementing every word, phrase or text that has been written or learnt into the plastic belief system of the word processing technique and utilising the methods operating on the belief'system.

1) Reading or comprehension (parsing) Problem

Current word processing techniques are not designed from the viewpoint of helping, the emergent student of English to read and comprehend a document—the only exception being grammar checking. Current word processing techniques do not help build an intimacy with the language in the areas of scansion (metrical analysis), rhyme, metaphor and other idiom procession. There exists a large pool of emergent readers and writers in our schools, and a large pool of students of English as a second language who are baffled by the English text documents. These documents may be printed on paper or computer documents downloaded from the Internet or held on disks. The difficulty may he individual words or more often the greater difficulty is that of coping with the English idiom. The English idiom can be perplexing for the newcomer to English and also to the computer parser in attempting to understand English. For instance the phrase 'on ice' can mean literally on ice such as standing in the Antarctic or it may mean 'in limbo'. In multicultural societies like Australia, Canada and the United States—the migrants who have adopted English as a second language often have difficulty expressing themselves. The problem is inappropriate or lack of idiom and the general lack of a congruent meter (and rhythm) to their writing. Often the newcomer to English misses out on the subtlety of alliteration and assonance thereby choosing the wrong word for the occasion. The glaring weakness is in the province of idiom. The components of idiom causing difficulties for the student may be metaphors, similes, metonymy, proverbs or other figures of speech. This content oriented word processing technique helps the student develop intimacy with the language and master the idiom of, in this instance the English language, in the following manner. This invention does so by provision of support for parsing of computer text documents to explain underlying idiom and provision of diction methods to help the user deploy the correct words, idioms or any linguistic object in his writing.

2) Writing Problem—Diction Difficulties

Current word processing techniques are designed to produce nice documents. Often it incorporates a spelling checker and may offer some advice on grammar. For the emergent writer it is hard to get started as there is no ready source of words and metaphors to get him or her started. With the content oriented word processing technique—suggestion of words and commonly used idiomatic expressions comprising the popular metaphors are proffered by use of a attribute (see genus) search or alternative diction strategies enumerated below. For example if the user wishes to use an idiomatic expression with attribute 'suspend' then idioms such as on ice and in cold storage will be displayed.

Diction is the choice of the right word or phrases for the occasion. There is a rich array of diction methods producing list of candidate linguistic object ranging from single words. phrases to text. The diction methods are based on meaning, rhyme, meter and attribute ( genus of a species word or phrase) or combinations of nominated taxa of the hierarchy thereof. In some schools, children are taught to collect gems of English expression in a book that may be titled "My Golden Treasury" or equivalent. Such a function will be useful for junior school students with their notebook computers. They can have a longitudinal record of everything they have written and every linguistic gem encountered and saved in their literary journey. In this instance the words and expressions are saved and incorporated in the belief system, augmenting the power of the word processing technique to process words and expressions in the next iteration of use.

Reading and writing are concurrent iterative and alternative processes. As reading/parsing and writing are intimately connected, at any stage the student using this word processing technique in either a 'reading' or 'writing' mode. In the 'reading' mode, he can select any word(s) or idiomatic expression(s) and get the content oriented word processing technique to explain the meaning of the words or idiomatic expressions if he has any doubt about what he has written. The 'writing' mode is selecting a diction method to get the belief system to output its suggestions of words, phrases, sentences or text.

3) intimacy with the language problem—solving word puzzles and having command of the language by reliance on belief system.

Crossword puzzles and word games such as Scrabble (trademark of its respective owner) help build intimacy with the language. This invention solves crossword and word game puzzles by virtue of its belief system comprising of a linnean hierarchy of words, phrases. sentences and text, all these linguistic objects are grist for the mill of the diction methods. It is par excellent as a trainer for any word games. This intimacy with the language is build up by the powerful word and phrase retrieval capability comprising attribute search, search by any combination of taxa of the belief system, diction methods, pattern matching and its anagram function. The anagram function works two ways—it can build subwords derived from a given string of characters or it can be given a phrase and it will generate a series of words whereby all the characters in the words are used to make up a new phrase utilising the exact characters in the test string. As an example the phrase 'Able was I' can venerate the complete anagram cum palindrome of 'I saw elba'. This anagram capability is derived by applying pattern matching functions on the belief system.

4) Plasticity of the belief system of this word processing technique. Utility is extended by the fact that the original core of the belief system is amenable to incremental change by the user. Utility is extended because the belief system spans the entire linguistic space comprising elements of words, phrases, individual sentences and text; and the formulation of a variety of methods that not only access, but operate, on the information held in this belief system model. Utility is extended because the disparate elements of the linguistic space are unified at the word processing environment while the user is thinking about what to write next. This model classifies linguistic space in a Linnean hierarchy and uses the nomenclature of the biological Linnean system. It includes the taxa at the levels of Kingdom, Phylum, Subphylum, Superclass, Class, Subclass, Order, Family, Genus and Species. A departure of this model from the Linnean model is the characteristic of multiple-inheritance, which means that a word species can belong to nil, one or more taxa at any level of the hierarchy. Traversing this hierarchy of word objects suspended in this Linnean framework, and its manipulation gives the original and literal meaning back to the description 'word processing'.

THE LINNEAN CLASSIFICATION OF WORDS, PHRASES, SENTENCES AND TEXT

Overview

The belief system of this invention is a Linnean hierarchy that spans the linguistic space of words, phrases, sentences and text. Definitions for the individual entities in the preceding sentence is given in the glossary. Each individual word, phrase, sentence and text is labelled as belonging to the species level. A general rule of the Linnean classification process is to collect species with a distinguishing characteristic and place them together in a named collection called a taxon (plural taxa). The higher level taxon has generally more members than a taxon at the lower level although this may not be strictly true. In biology, a feature such as presence or otherwise, of a backbone creates the basis of classifying species into vertebrates and invertebrates. Other features used in biology to create broad taxa are characteristics of placenta, hair and egg-laying. In linguistic classification, a good distinguishing mark is whether the meaning of the linguistic object is literal or abstract. Other taxa employed in this classification are on the basis of complexity of structure ranging from word to text, proverbs, metaphors, metonyms, synecdoche, litotes, similes. epigrams etc. Each linguistic object species may belong to nil, single or multiple taxa at any level. For example the expression 'Wall Street' is a phrase species with membership in both the literal and abstract taxa. Its literal meaning is 'a street in New York'. The expression 'Wall Street' is also an abstract object belonging to the two taxa of 1) Metaphor and 2) Metonymy. This phrase object means 'the United States share market or the corporate world of USA'. Another example is the phrase 'ebb and flow' whose meaning is 'fluctuations' and of type metaphor. Hence linguistic space is organised into Literal and Abstract (non-literal) taxa at the Phylum level. The word or phrase species may belong to one or both taxa.

The belief system underlying the didactic content oriented word processing technique is the data structure to represent this linnean classification to linguistic space and a collection of methods to manipulate the data structure.

KINGDOM LEVEL

In the beginning, right at the top of the Linnean hierarchy at the Kingdom level, is Word. This solitary Word taxon contains all linguistic space comprising linguistic objects that may be a word, a phrase, a sentence or text, where a phrase is an expression with two or more words. All the individual objects of linguistic space are defined to be at the species level, they are mapped onto the taxa of this Linnean hierarchy. A species may belong to nil, one or multiple taxa at an) hierarchical level.
taxon: Word

PHYLUM LEVEL

At the next level of Phylum, the taxa are huge, namely Literal. Abstract, Verse and Prose.

The importance of this level is that abstract meaning of linguistic objects baffle the student of the language more than anything else.

The literal taxon contains all linguistic objects that are direct in their meaning.

The Abstract taxon contains all linguistic objects that have a different meaning apart from their literal meaning.

Verse is writing arranged on a metrical pattern. Verse makes a language sing and complete. Classification of text into verse or prose will restore the balance of importance between essay and poetry.

Prose is text that is not verse.
taxa: Literal, Abstract, Verse, Prose

SUBPHYLUM

The criterion for classification here is based on the complexity of the word structure. Linguistic space can be broken into words, phrases, individual sentences and text.

Individual words belong to the taxon Words.

A phrase of two or more words, but lacking the structure of a sentence belongs to the taxon Phrases.

A single sentence belongs to the taxon Sentences. Proverbs and aphorisms generally belong to the taxon Sentences.

Verse or prose comprising two or more sentences belongs to the taxon Text.
taxa: Words, Phrases, Sentences, Text.

SUPERCLASS

This level comprises the taxa reflecting the national or regional origins for the word /phrase:/sentence/text.
taxa: Latin, Greek, Old English, Middle English, French or even German. Other taxa are International, American, Australian, Chinese, Singaporean, South African, New Zealand, Caribbean, French, Russian, Jewish, Arabic, Japanese, Malaysian, . . . .

CLASS

Denotes forms of prose or verse.
Taxa: Ballad, Couplet, Epigram, Epitaph, Haiku, Soliloquy, Sonnet, Limerick, Allegory, Elegy, Comedy, Epic, Parody, Narrative, Occasional, Satire, Tragedy, Essay, Letter, Romance, Legalese, Professional, Business, Social, Speech

SUBCLASS

Traditional grammatical analysis classifies words along function:
taxa: noun, pronoun, verb transitive, verb intransitive, adjective, adverb, preposition, indefinite article, definitive article, conjunction, interjection, participate adjective, plural, past participle, preterit.

ORDER

Classification is based on the type of idiom
taxa: Metaphor, Aphorism, Proverb, Litotes, Simile, Onomatopoeia, Idiom, Synedoche, Metonymy

FAMILY

Meter is the basis of versification. For the purpose of scansion (metrical analysis), words with the same metrical characteristic are classified together.

In this notation the small d is the unstressed syllable, while the stressed syllable is denoted as a capital D.

meter—expressed as a string where dt) is an iamb, Dd the trochee

—ddD is an anapestic foot and Ddd is the dactylic foot.

—d is an unstressed syllable and D is a stressed syllable e.g.

'begin' is dD

HARmony is dactylic and is coded as Ddd exCEED is iambic and is coded as dD

This level comprises the taxa for the various metrical patterns, examples being iambic, anapestic, dactylic, trochaic and combinations thereof.
taxa: dD, ddD, Dd, dDdD etc.

SUBFAMILY This level is reserved for taxa of the homonym type.

Words of the same homonym belong to same taxon.

GENUS

This level comprises the taxa which are named after attributes such as hot, red, spidery, smooth, slimy cool, green, luxurious, art etc. In the last instance the genus called 'art' will hold the following word species: 'art deco' cubism'baroque' 'bauhaus'expressionism' 'impressionism' neo-classicism' 'realism' 'pop art' and 'surrealism'. While a genus like 'horse' contains the word species of: 'croup' 'rump' 'gaskin' 'stifle' 'hock' 'hoof' 'castor' 'fetlock' 'cannon' 'pasten' 'forelock' 'poll' 'withers'.

SUBGENUS

This level comprises the root words, the taxa reflecting the etymological basis for the actual word or phrase. For example the words ballad, ball, balladeer would belong to the taxon called 'ballare' in Latin means dance). Hence most of the terms here are specific Latin, Greek, Old English, Middle English, French or even German words.

SUPERSPECIES

This level comprises the taxa that are the root words that give rise to the variations at the species level. For instance the taxon at this level called 'go' contains the following species: 'gone' 'going' and 'go'

SPECIES

This level comprises the words, phrases, individual sentences and text.

Each species knows all the taxa that they belong to. At the genus level taxon, membership can be on a continuous logic (fuzzy logic) basis ranging from 1.0 which means 100% congruency to 0.0 which is non membership of the taxon.

The Computer Data Structure of the Classification

In this embodiment of the logic of the classification system, the data structure reflects the Linnean hierarchical classification used for the linguistic space. The data structure comprises 4 Lexicons. The first lexicon is for all word species, the second lexicon is for phrase species, the third lexicon for sentence species and the fourth lexicon is for text species. The lexicon is a Dictionary object in Smalltalk parlance; in a Dictionary structure there is a series of individual key and value pair. Each species has a primary key points access—the name of the word itself, or the phrase or sentence itself. Each species key points to a programming object as its value, this programming object has as its individual instance variables the following:

KINGDOM LEVEL: Word
PHYLUM LEVEL: Literal, Abstract, Verse, Prose.
SUBPHYLUM Words, Phrases, Sentences and Text.
SUPERCLASS: International, English, American, Australian, Singaporean, South African, New Zealand, Caribbean, French, German, Latin, Greek . . . .
CLASS: Ballad, Couplet, Epigram, Epitaph, Haiku, Soliloquy, Sonnet, Limerick, Allegory, Elegy, Comedy, Epic, Parody, Narrative, Occasional, Satire, Tragedy. Essay, Letter, Romance, Legalese, Professional, Business, Social, Speech
SUBCLASS: noun, pronoun, verb transitive, verb intransitive, adjective, adverb, preposition, indefinite article, definitive article, conjunction, interjection, participate adjective, plural, past participle, preterit.
ORDER: Metaphor, Aphorism, Proverb, Litote, Simile, Onomatopoeia, Idiom
FAMILY: iambic, anapestic, dactylic, trochaic and combinations thereof.
GENUS: This level comprises the taxa which are named after attributes
SUBGENUS: The original term in Latin, Greek, Old English, Middle English, French, German etc.
SUPERSPECIES: the root word
SPECIES: The word, or phrase, or sentence or text itself.
synonym:
antonym:
literal meaning:
abstract meaning:
pronunciation:
Commentary:

Practical examples of each type of species are given in the section on technical operations. A benefit of this framework is that it solves the philosophical conundrum about meaning of words referred to as the 'ambiguity of ostension'. In this conundrum, the meaning of a word is given as another word which the user does not comprehend, and ad infinitum. This is resolved in this framework by adducing meaning to a word or phrase or any linguistic object. by their memberships in taxa, hence relationships, in this Linnean type classification. When looking up a word such as 'umbilicus' it points to the meaning 'navel'. yet on looking up 'navel', the dictionary points back to the word 'umbilicus' or 'omphalos'—this is a shortcoming to a new student of the language. This problem is analogous to defining who a person is. An example is Joe Blow he could change his name nine times by deed poll, with him ending up with nine aliases. Using any of the aliases do not really help in explaining, who Joe Blow is. However meaning is incrementally arrived at with information regarding membership of taxa (taxa are collections with given name attributes). Given the information that Joe Blow belongs to the taxa of 1) male 2) policeman 3) smoker 4) diabetic 5) Australian 6) middle-age 7) fly fisherman 8) stamp collector 9) born in 1969) etc. would provide meaningful definition of who Joe Blow is. The content oriented word processing technique resolves the ambiguity of ostention by imparting meaning based on relationships through the process of fitting, every word, phrase, individual sentence and text into taxa located in the framework of the Linnean type hierarchy.

The classification system alluded to, comprehensively sorts and classifies the whole of linguistic space. Properties are mapped to each linguistic object which may be a word. phrase, sentence or text—each linguistic object is a species which knows its position and relationships to the taxa in the Linnean framework. Each species object contain membership information of taxa of the Linnean hierarchy. This invention allows the user to open a text edit pane that can be described as a word bench or work space. This text edit area serves as both 1) an input area for the creation and editing of text 2) a transcript area for the output by the diction methods operating on the belief system. There are four categories of functions associated with this didactic content oriented word processing technique: 1) parsing assistance 2) writing assistance and 3) building intimacy with language/word game puzzle assistance and 4) incremental build of the belief system. Utilising this belief system of linguistic space—the parsing assistance functions are 1) ability to explain meaning of selected word or phrases 2) detect and explain all metaphors in selected text 3) performs metrical analysis of selected text for its underlying rhythmic structure. The rhythm of the text is output on the work space. For instance, the meter known as iambic pentameter is the most common meter used in English poetry. Versification is then simplified as metrical analysis is automated. 4) paraphrase selected text—often the student of English may have difficulty with a passage. But when the passage is paraphrased with other words and stripped off the underlying idiom (and replaced by substituted words with literal meaning), the passage may be understood better. The writing assistance functions are supported by diction methods operating on the belief system. Some diction methods utilise a query box with means for 1) listing of all exact rhymes 2) listing of all slant, visual and inexact rhymes such as alliteration and assonance 3) list of onomatopoeia words 4) construction of list of all words and sub words derived from a given string of characters 6) construction of list of all single and multi-word anagrams 7) attribute search and listing of metaphors/idiomatic constructs 8) synonyms/antonyms listing to each word selected. 9) single or multiple Genus attributes search—e.g. a search based on the Genus level taxon 'spider' will list i) arachnophobia ii) web iii) arachnid iv) black widow v) red back 10) word/phrase/sentence/text diction search based on the multilevel hierarchical/multi-taxa of the belief system. An example being to select Phylum: verse. Genus: (Wordsworth, joy) will produce a listing of his poem about Tintern Abbey.

Some of these diction methods are i) rhyming modes ii) meaning iii) synonyms iv) antonyms v ) attributes and vi)

metre or musical rhythm of the word. Word puzzle solving is achieved by the following means. The didactic word processing technique will list all the possible words given a collection of alphabets and or wildcards. There are two types of wildcards, the*wildcard is any number from zero onwards of any character. The wildcard is one character of any type. The Crossword type puzzles are solved by using the same functions as for word game—such as anagram listing, listing of words by wildcard search, attribute search for words, multilevel query of the belief system.

BRIEF DESCRIPTION OF THE DRAWINGS

FIG. 1 is an example of a computer object record in the Words Dictionary according to the preferred embodiment of the present invention.

FIG. 2 is an example of a computer object/record in the Phrases Dictionary according, to the preferred embodiment of the present invention.

FIG. 3 is an example of a computer object/record in the Sentences Dictionary according to the preferred embodiment of the present invention.

FIG. 4 is an example of a computer object/record in the Text Dictionary according to the preferred embodiment of the present invention.

DESCRIPTION OF FIGURES AND EMBODIMENT OF INVENTION

Figure 5:
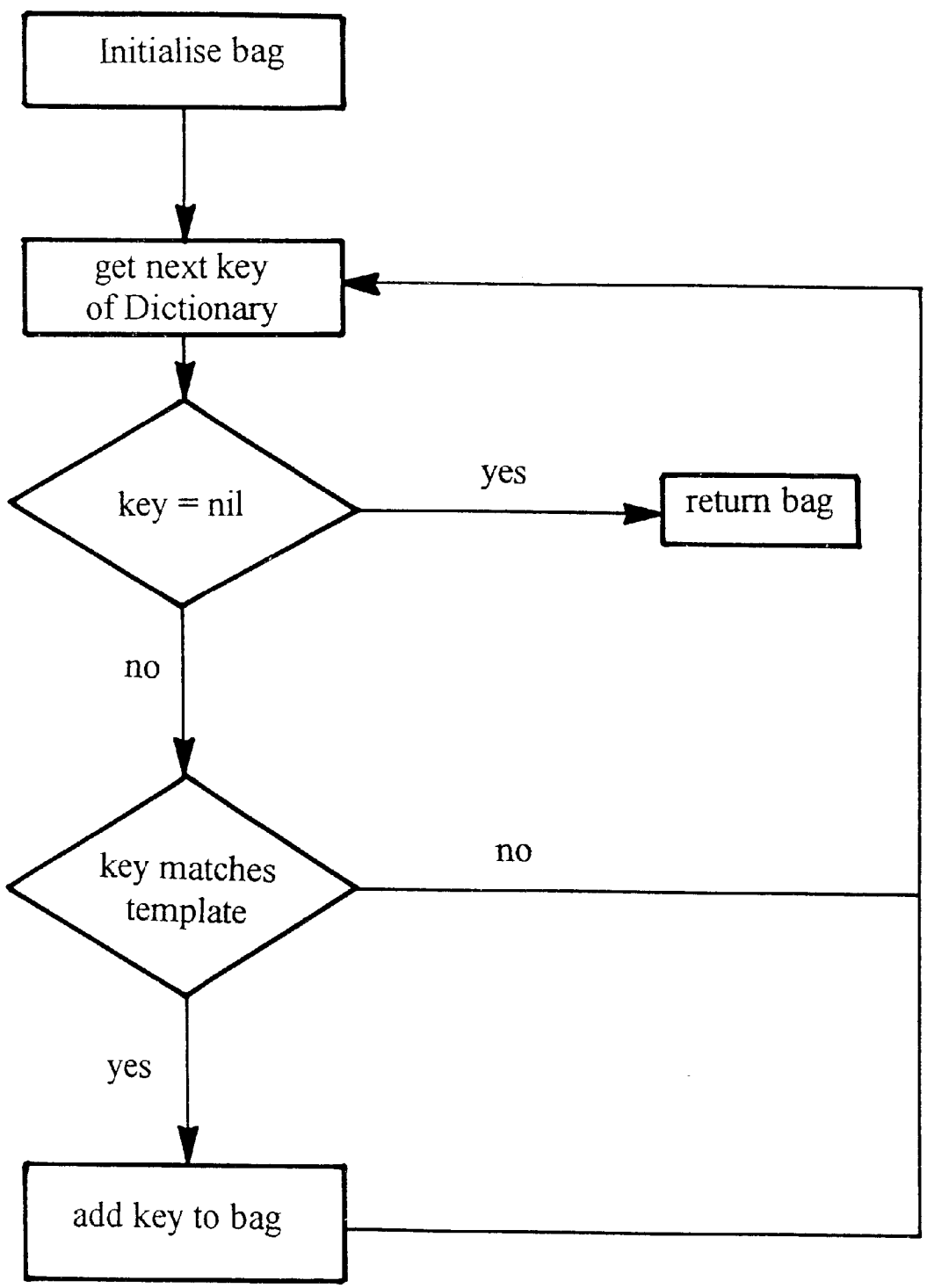
FIG. 5 is a flowchart of an exemplary subroutine for matching a string pattern according to the preferred embodiment of the present invention.

Basic pattern matchings subroutines used by the methods operating on the belief system.

i) Subroutine for pattern matching using a choice of two types of wildcards. These two types of wild cards can be used concurrently. 1) the fixed ONE character wildcard is the dot '.' wildcard character, matches for any single character 2) the variable length wildcard '*' is the asterisk, it matches from zero to a variable number of characters. The relationship between these two wildcards is that * wildcard is expanded from nil to fifteen wildcard of the type dot, assuming that the maximum size of words is 15.

The means for this word processing technique are derived from methods operating on the Linnean belief system outlined above.

The multi-hierarchical multi-inheritance belief system of linguistic space, in one practical embodiment, is represented by the following computer data structures. The description is in the Smalltalk computer language, a skilled practitioner will be able to implement the data structures in any high level languages such as Java or C++.

There are four Dictionary objects, there is a single Dictionary or each of the following categories of species: 1) words 2) phrases 3) sentences 4) text. See FIGS. 1 to 4.

FIG. 1. WORDS DICTIONARY

The 'words' Dictionary has individual words for its keys. Each key points to a computer object as record, which contains information regarding memberships of taxa. An example is an entry for the word 'rubbish', the instance variables or fields of the record are:

Kingdom: WORD
Phylum: Literal Abstract
Subphylum: Words
Superclass: Middle English
Class: noun
Subclass: nil
Order: nil Family: iambic (dD)
Genus: dross nonsense
Subgenus: rubbish
Superspecies: nil
Species: rubbish
synonym: trash dross refuse litter rubble waste garbage
antonym: treasure valuable gem
literal meaning: unwanted things to be thrown away
abstract meaning: nonsense
pronunciation: ru~b~ish The structure of the computer object as record is identical for all four Dictionaries of Words. Phrases, Sentences and text. Each species has a field for pronunciation: this area stores the phoneme sequence providing means for speech input and output technology.

FIG. 2. THE PHRASES DICTIONARY

The 'phrases' Dictionary has individual phrase for its keys. Each key points to a record or computer object which contains information regarding memberships of taxa. An example is the entry for the phrase 'go between' in this Phrases Dictionary.

Kingdom: WORD
Phylum: abstract
Subphylum: phrases
Superclass: nil
Class: nil
Subclass: prose
Order: metaphor
Family: ddD (anapestic)
Genus: intermediary
Subgenus: nil
Superspecies: nil
Species: go between
synonym: broker, intermediary matchmaker
antonym: nil
literal meaning: nil
abstract meaning: broker
pronunciation: go bi~tw~en

FIG. 3. THE SENTENCES DICTIONARY

The 'sentences' Dictionary has an individual sentence for its keys. Each key points to a record or computer object which contains information regarding memberships of taxa.

Example of classification of an entry into this Dictionary of the sentence 'A rolling stone gathers no moss.'

Kingdom: WORD
Phylum: abstract prose
Subphylum: sentences
Superclass: nil
Class: nil
Subclass: nil
Order: Proverb
Family: dDdDdDdD
Genus: rolling stone moss persistence opportunity drifter
Superspecies: nil
Species: a rolling stone gathers no moss
synonym: drifter
antonym: nil
literal meaning: nil
abstract meaning: lack of persistence leading to failure
pronunciation:

FIG. 4. THE TEXT DICTIONARY

The 'text'Dictionary has computer generated names as its keys. The key to each text chunk is comprised from concatenating the first characters of the first eight words, if available, of the text. For example a text chunk is given the key name 'abcdefgh'. The next time around, if the next text chunk generates the same key, if such a key is unique, then it is used unchanged. In the event of repeating key, use of an ascending suffix moiety resolves the conflict: the suffix 0.1 is added to give the concatenated key 'abcdefg.1'. The third key with 'abcdefg' will be renamed 'abcdcfg.2' etc.

Each of the computer generated key is a string of characters that is the name of a computer text file stored on disk. Each key points to a computer object as record which contains information regarding memberships of taxa.

From these four Dictionaries, the Dictionaries for each named Linnean level are then constructed. Hence we have individually named Dictionary for Phylum, Subphylum. Superclass, Class, Subclass, Order, Family, Genus and Subgenus. Furthermore, each of these Dictionaries have as their keys the names of the taxa located at its own individual level. The key which is the taxon name points to a Set that comprises all linguistic object species that belong to the taxon.

FIG. 5 Subroutine for matching a string pattern enables results to be returned in a Bag (a Bag is a data structure of the type Collection in the Smalltalk language). All the keys of the lexicon that match the template string are returned. If a String is '*ssive' then this match pattern with a wildcard would return a bag that contains 'regressive' 'missive' etc.

Whereas a search string such as 'p.ssive' will return 'passive' etc.

These functions are based on and provided for in foundation Smalltalk Classes String. Pattern and Wildpattern.

Figure 6:
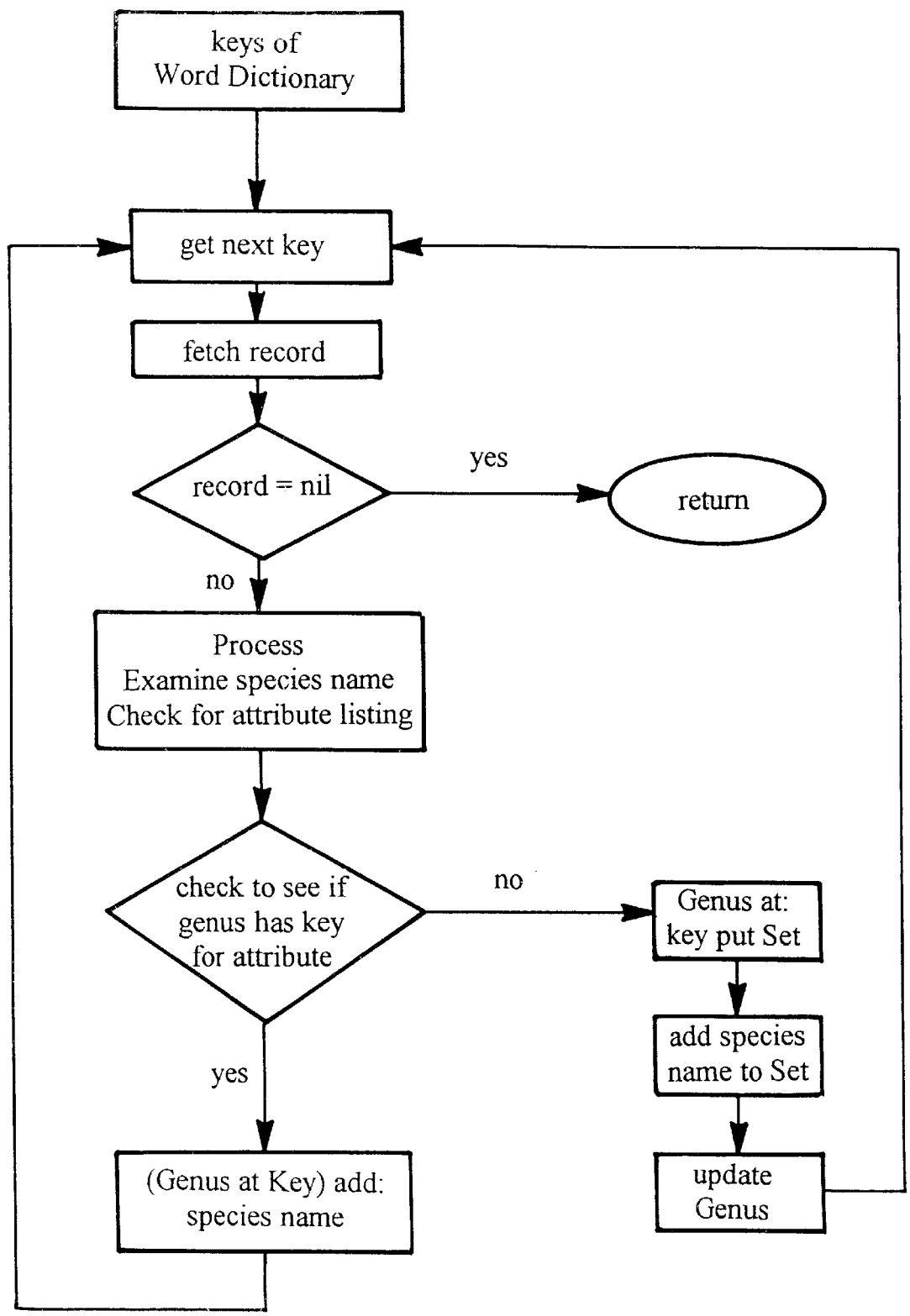
FIG. 6 is a flowchart of an exemplary method for constructing the Genus Dictionary according to the preferred embodiment of the present invention.

FIG. 6 'Build Genus'. Each Level Dictionary is constructed by traversing every record of the four Dictionaries of words, phrases, sentences and text. This flowchart shows how the Genus Dictionary is constructed. This is representative of how the other dictionaries such as for Phylum. Class. Order, Family etc. are constructed. Every taxon at any level of the Linnean hierarchy contains a Set of elements of the type word, phrase, sentence or text species.

Figure 7:
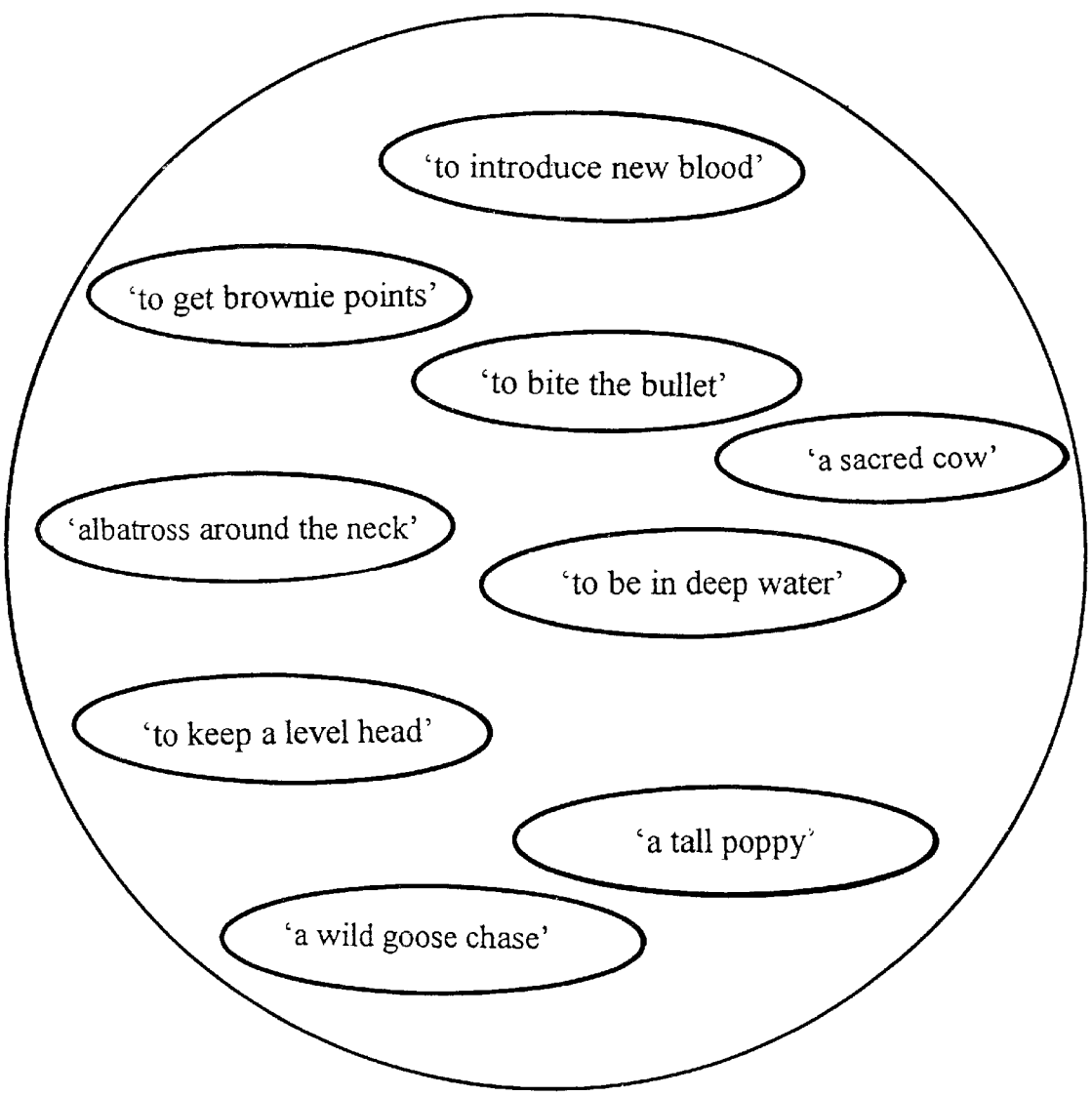
FIG. 7 is an exemplary representation of an Abstract taxon at the level of Phylum according to the preferred embodiment of the present invention.

FIG. 7 The Abstract taxon at the level of Phylum is a very big Set that comprises i) all single words with abstract meanings and ii) all idiomatic expressions such as metaphors, similes, proverbs, metonymy etc. The Abstract taxon is used to implement the means to scan for embedded idioms hidden in text. The elements of the taxon can be sorted using a Smalltalk method called asSortedCollection. An Abstract Dictionary can be constructed using the elements of the set as keys and its respective meanings as the value pointed to by each key.

Figure 8:
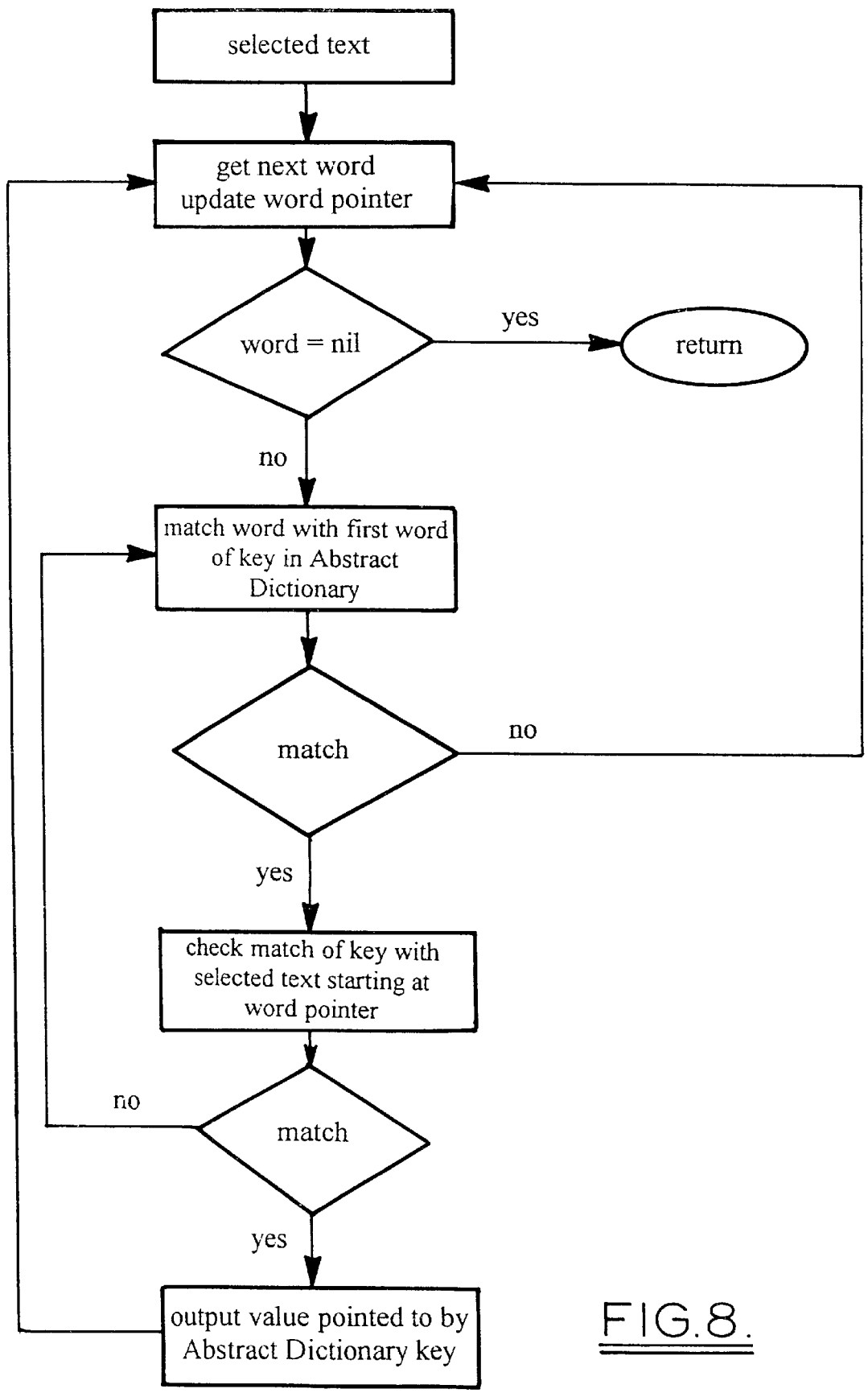
FIG. 8 is a flowchart of an exemplary method for an idiomatic processor function according to the preferred embodiment of the present invention.

FIG. 8 Idiomatic processor function.

The user, when he encounters a chunk of text he does not understand, rather than a single word that he does not recognise, selects text that encompasses the difficult passage. The user selects a chunk of text in the word bench. He then chooses the 'Please explain idiom' item in the drop down menu titled 'Utilities'.

The method detects and explains all idioms (non-literal expressions including metaphors) in selected text. This function scans for embedded idioms. A message box will explain the meaning of each detected idiom embedded in the text selection in turn. The idiom may be metaphors, similes, proverbs, metonymy etc. The method of operation is to match a substring (i.e. word) in the selected text with any, of the keys to the Abstract lexicon. The matching algorithm works along the basis of parsing one word at a time, if the first word match the first word of an expression key, then the second word is matched until all the words for the expression are matched whereupon the meaning of the expression is looked up in the object detected and read. The meaning of the non-literal expression is then output in the word bench window.

Figure 9:
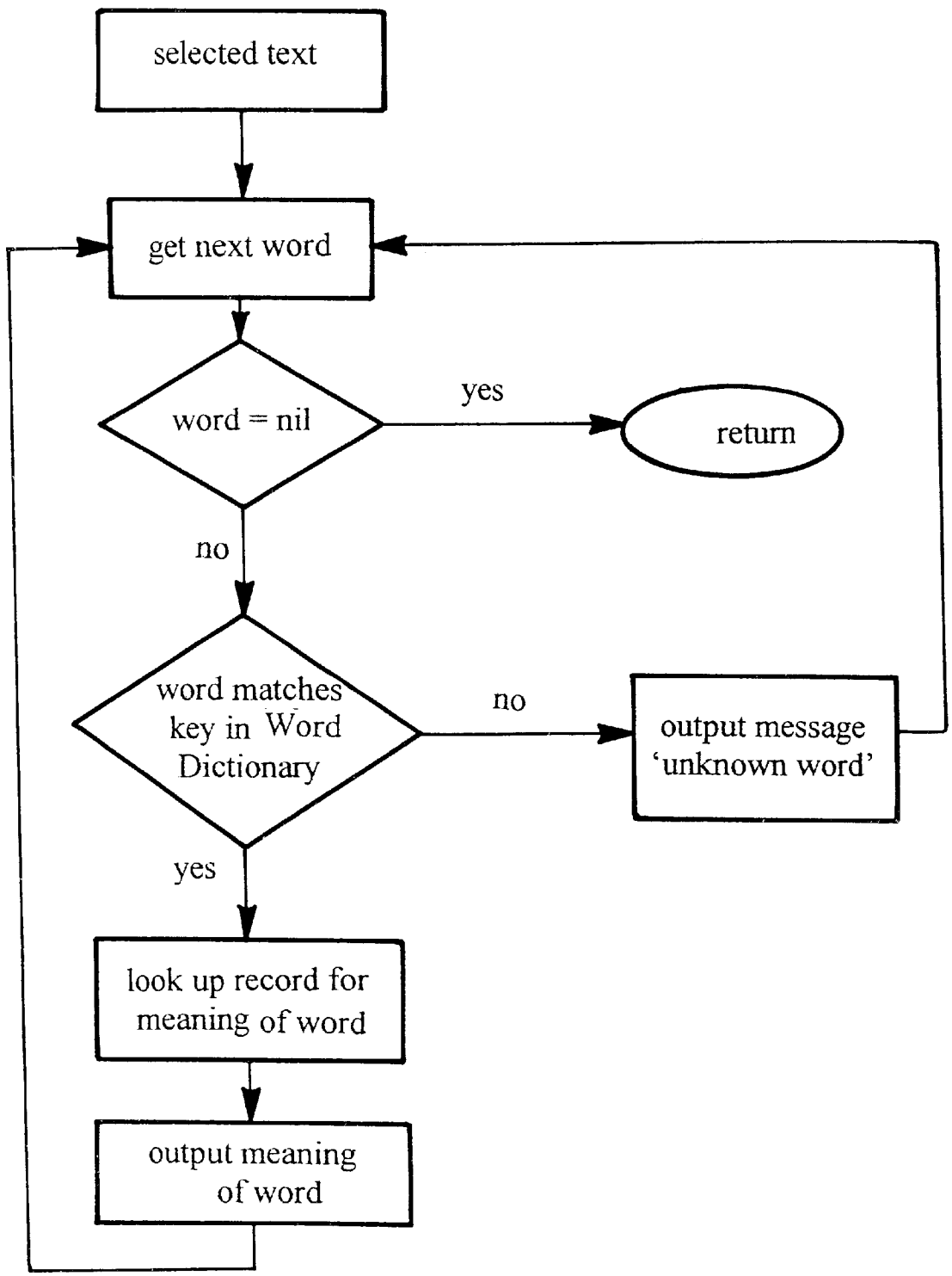
FIG. 9 is a flowchart of an exemplary method for fetching the meaning of an individual word according to the preferred embodiment of the present invention.

FIG. 9 The flowchart to explain how the meaning of individual word is fetched.

Figure 10:
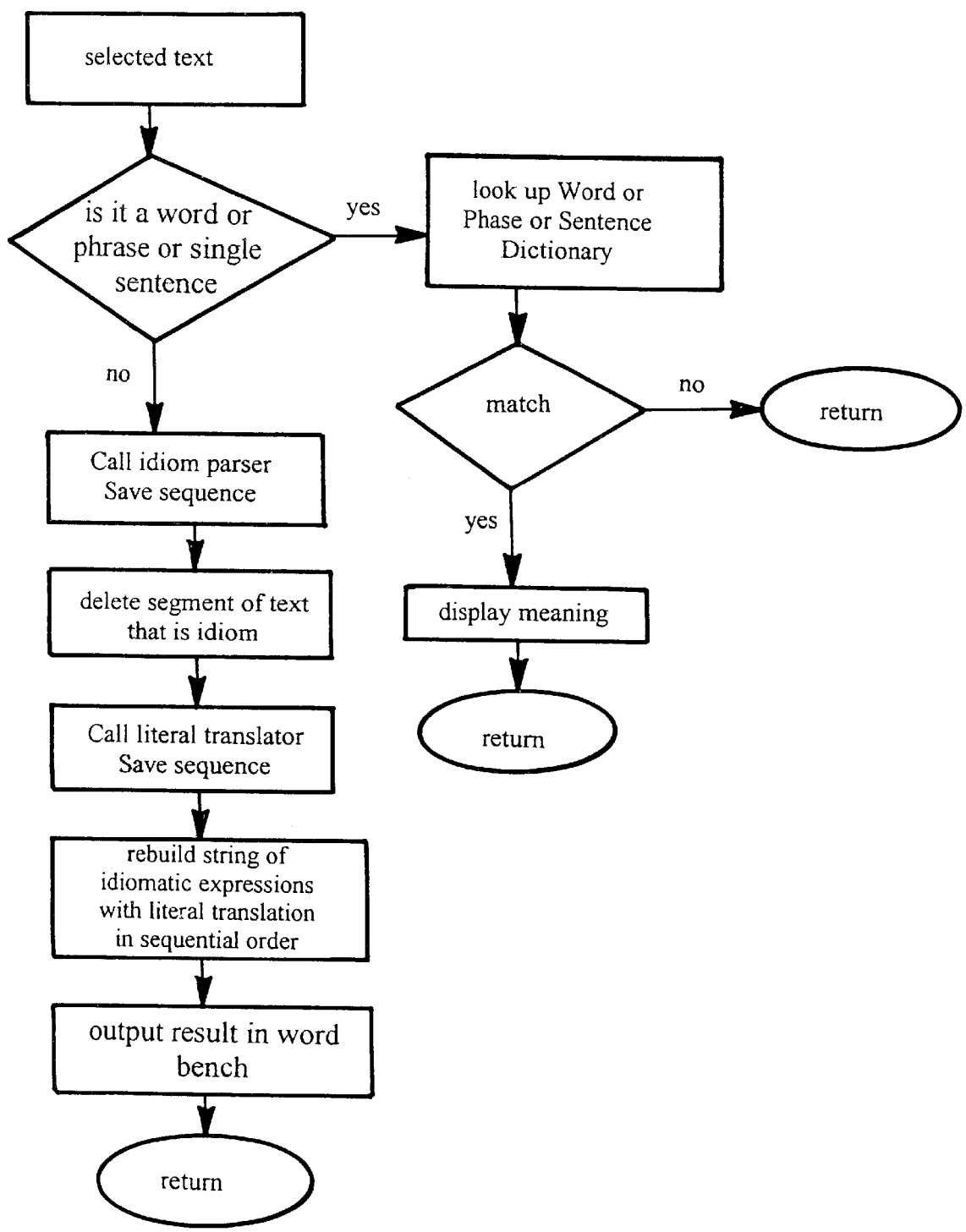
FIG. 10 is a flowchart of an exemplary method of the please explain paraphrase meaning function according to the preferred embodiment of the present invention.

FIG. 10 The please explain/paraphrase meaning function. Ability to explain meaning of selected word, phrase or individual sentence for its simple (literal) and any idiomatic (abstract) meaning.

The user selects one or more words in the word bench, lie then chooses the 'Please explain' item in the drop down menu titled 'Utilities'. The selection is parsed to determine if it is a word, a phrase or a sentence. The selection is then looked up as a 'key' in the appropriate Dictionary for Words or Phrases or Sentences. In the event of a perfect match, the computer object associated with the key will return the meaning of the selection in a dialogue box.

In the event that no match is found then the selected text undergoes a two pass parser—the first parse is for idiom expressions, while the second is for the literal meaning of each word in the selected text. The results of the two passes are outputted in sequence, and the user is informed as to its literal and/or non-literal interpretation of the meaning. A message box will explain the meaning of each word/ expressions in turn via the use of a dialogue box. The parser for embedded idioms is seen in FIG. 8. The parser for the literal word/expression is seen in FIG. 9.

Figure 11:
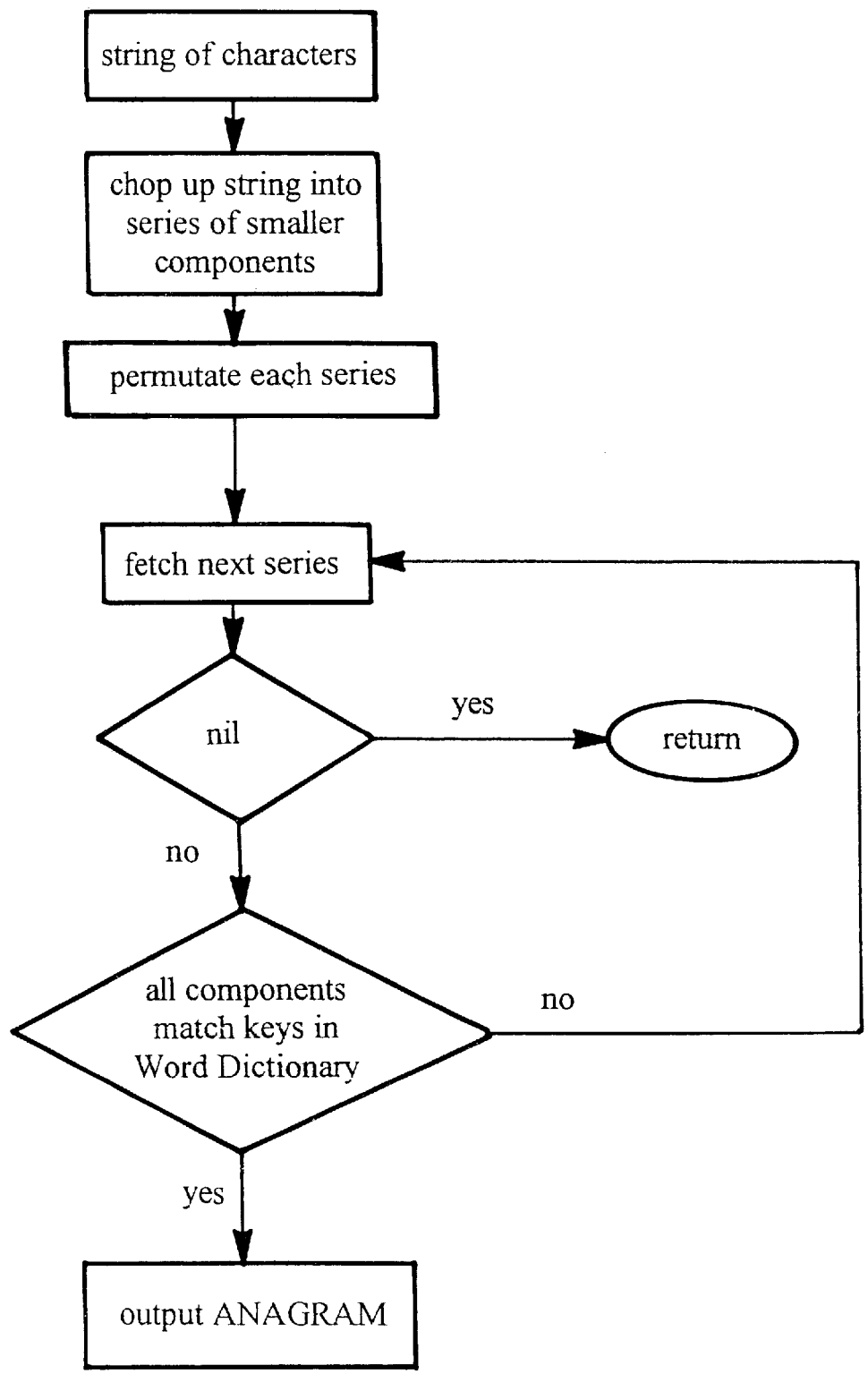
FIG. 11 is a flowchart of an exemplary method for the construction of a list of sets of multi-word anagrams according to the preferred embodiment of the present invention.

FIG. 11 Construction of list of sets of multi-word anagrams—example the string 'ablewasi' will generate a list of phrases such as 'able was I' and 'I saw elba'

Method of operation is by using the wildcard to generate all possible patterns with the maximum number of characters equal to the word constraint. Combinations of word patterns that are exact match of the constraint string are the successful candidates are then listed. Two examples are given for the names behind the names of Bill Clinton and Bill Gates. Amazingly, the name John Howard does not generate any anagrams in this program.

Figure 12:
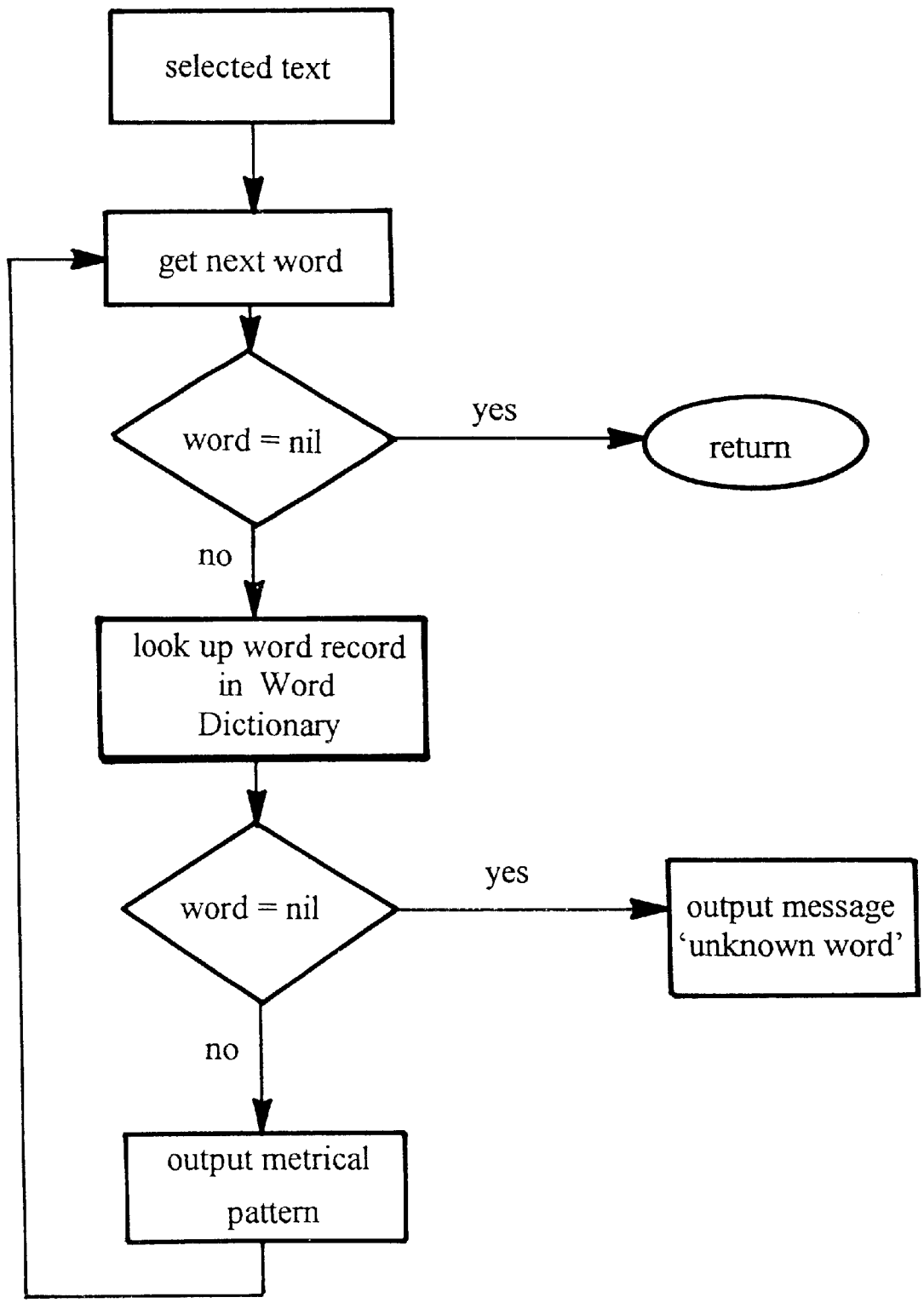
FIG. 12 is a flowchart of an exemplary method for analysis of selected text for its underlying rhythmic structure according to the preferred embodiment of the present invention.

Example is given using the raw letters: 'billclinton'.
Below is the output:
Anagrams detected
words of size: 4
  bloc
words of size: 3
  inn
words of size: 4
  lilt
  till
Anagrams detected
words of size: 4
  bill
words of size: 3
  inn
words of size: 4
  cint
  colt
Example using string: 'billgates'
Anagrams detected
words of size: 5
  libel
words of size: 4
  stag
Anagrams detected
words of size: 5
  stale
  steal
  slate
  least
words of size: 4
  glib
Anagrams detected
words of size: 5
  stage
words of size: 4
  bill
Anagrams detected
words to size: 5
  beast
words of size: 4
  gill
Anagrams detected
words of size: 4
  slit
  list
  silt
words of size: 5
  gable
Anagrams detected
words of size: 1
  i
words of size: 4
  bell
words of size: 4
  stag
Anagrams detected
words of size: 3
  all
words of size: 3
  its
  sit
words of size: 3
  beg
Anagrams detected
words of size: 3
  ill
words of size: 3
  sat
words of size: 3
  beg
Anagrams detected
words of size: 3
  all
words of size: 3
  set words of size: 3
  big
  Anagrams detected
words of size: 3
  set
words of size: 3
  ill
words of size: 3
  bag
  Anagrams detected
words of size: 3
  ill
words of size: 3
  sag
  gas
words of size: 3
  bet
  Anagrams detected
words of size: 2
  is
words of size: 3
  bag
words of size: 4
  tell
  Anagrams detected
words of size: 3
  ill
words of size:
  be
words of size: 4
  stag
  Anagrams detected
words of size: 2
  is
words of size: 4
  bell
words of size: 3
  tag
  Anagrams detected
words of size: 4
  sill
words of size: 2
  be
words of size: 3
  tag
  Anagrams detected
words of size: 4
  slit
  list
  silt
words of size: 2
  be
words of size: 3
  lag
  Anagrams detected
words of size: 2
  be
words of size: 4
  lilt
  till words of size: 3
  sag
  gas
  Anagrams detected
words of size: 4
  sill
words of size: 2
  at
words of size: 3
  beg
  Anagrams detected
words of size: 2
  as
words of size: 4
  bill
words of size: 3
  get
  Anagrams detected
words of size: 2
  be
words of size: 3
  sat
words of size: 4
  gill
  Anagrams detected
words of size: 2
  as
words of size: 4
  tell
words of size: 3
  big
  Anagrams detected
words of size: 2
  as
words of size: 3
  bet
words of size: 4
  gill
  Anagrams detected
words of size: 2
  as
words of size: 4
  lilt
  till
words of size: 3
  beg
  Anagrams detected
words of size: 2
  is
words of size: 4
  belt
words of size: 3
  lag
  Anagrams detected
words of size: 4
  sell
words of size: 2
  at
words of size: 3
  big Anagrams detected
words of size: 4
  tall
words of size: 2
  is
words of size: 3
  beg
Anagrams detected
words of size: 3
  let
words of size: 2
  as
words of size: 4
  glib
Anagrams detected
words of size: 4
  ball
words of size: 2
  is
words of size: 3
  get
Anagrams detected
words of size: 3
  leg
words of size: 5
  blast
words of size: 1
  i
Anagrams detected
words of size: 1
  i
words of size: 5
  stall
words of size: 3
  beg FIG. 12 Means for analysis of selected text for its underlying rhythmic structure—for instance the meter known as iambic pentameter is the most common meter used in English poetry. For the budding poet, the selected text will be analysed for meter and a screen printer output of the rhythmic structure of the poem will be printed. Meter analysis is by parsing line by line.

Each line is then parsed word by word, each word has its meter read of its object held in the Complex lexicon, and written to the output text. In the event that the word is not found in the lexicon, then the source word is output unchanged in the output text. A diagnosis of the meter is printed at the end of each line scanned. For example the scansion of the text from John Milton (1608–1674).

'On the morning of Christ's Nativity' is stressed along the following manner.
on THE morNING of CHRISTS naTIViTY—>dDdDdDdDdD—>iambic pentameter line.

Figure 13:
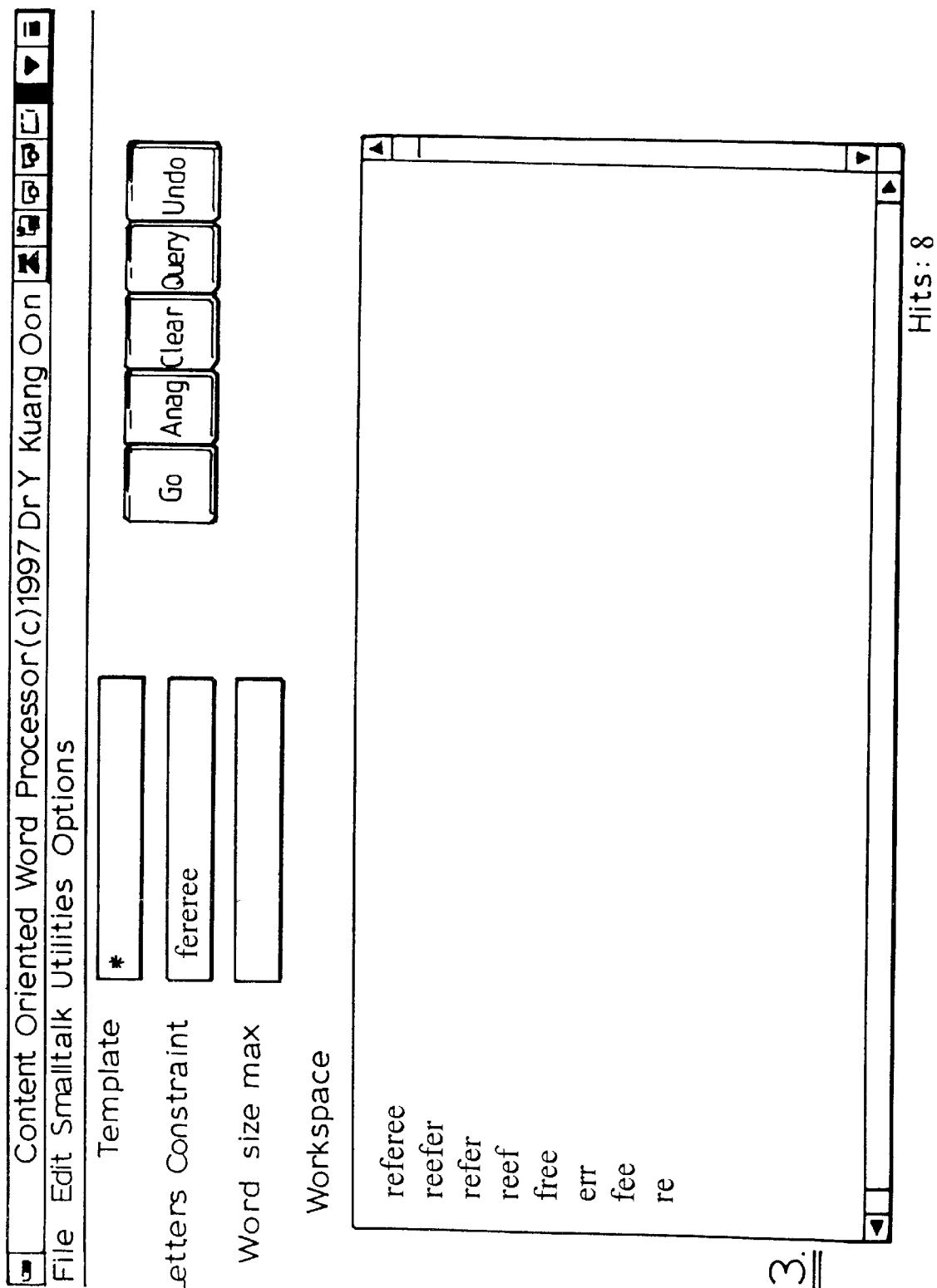
FIG. 13 is a main graphical user interface (GUI) seen by the end user according to the preferred embodiment of the present invention.

FIG. 13 The mainview seen by the end user. Based on the above linnean data structure and subroutines, the following means are available in the mainview, in this figure, the word bench/workspace pane is depicted with associated entry fields for formulating the query. associated buttons and drop down menu. The means for a simple query starts with a query box labelled 'Template' where the user can input the query string. The entry field labelled 'Letters constraint' allows the user to specify use of only the letters in this box in generating the output, this latter case is de rigeur in certain word games. Word size max allows the user to screen out words that exceed this length. In this example given, the template is * which implies any words of any length. The constraint is the string, 'fereree'. The query is launched by clicking the 'Go' button next to the query box; this leads to the output of 8 words ranging from referee, reefer, refer, reef, free, err, fee and to re. The number of hits (8) is recorded in the bottom right hand corner. 3) Listing of all exact rhymes. In the template box the user types in a search such as '*ing' to list all words which end with 'ing'. This sets up the search for words with the same end rhymes. The wild card character '*' matches any number (from zero onwards) and any type of characters. For selection of words of a fixed length the constant wild card '.' is used. The search with template '. . . ing' will produce a list of words six character long ending with 'ing'. The search string in the input box is matched with all the candidate keys of the Words Dictionary. Another query could start from the letters constraint: 'fereree' and the template constraint of '*ee'. The results would be fee, free and referee. The entire contents, of the word bench/workspace can be copied across to an application such as Microsoft word processor using Dynamic Data Exchange—in the event that the user is concerned about form as well as substance.

Figure 14:
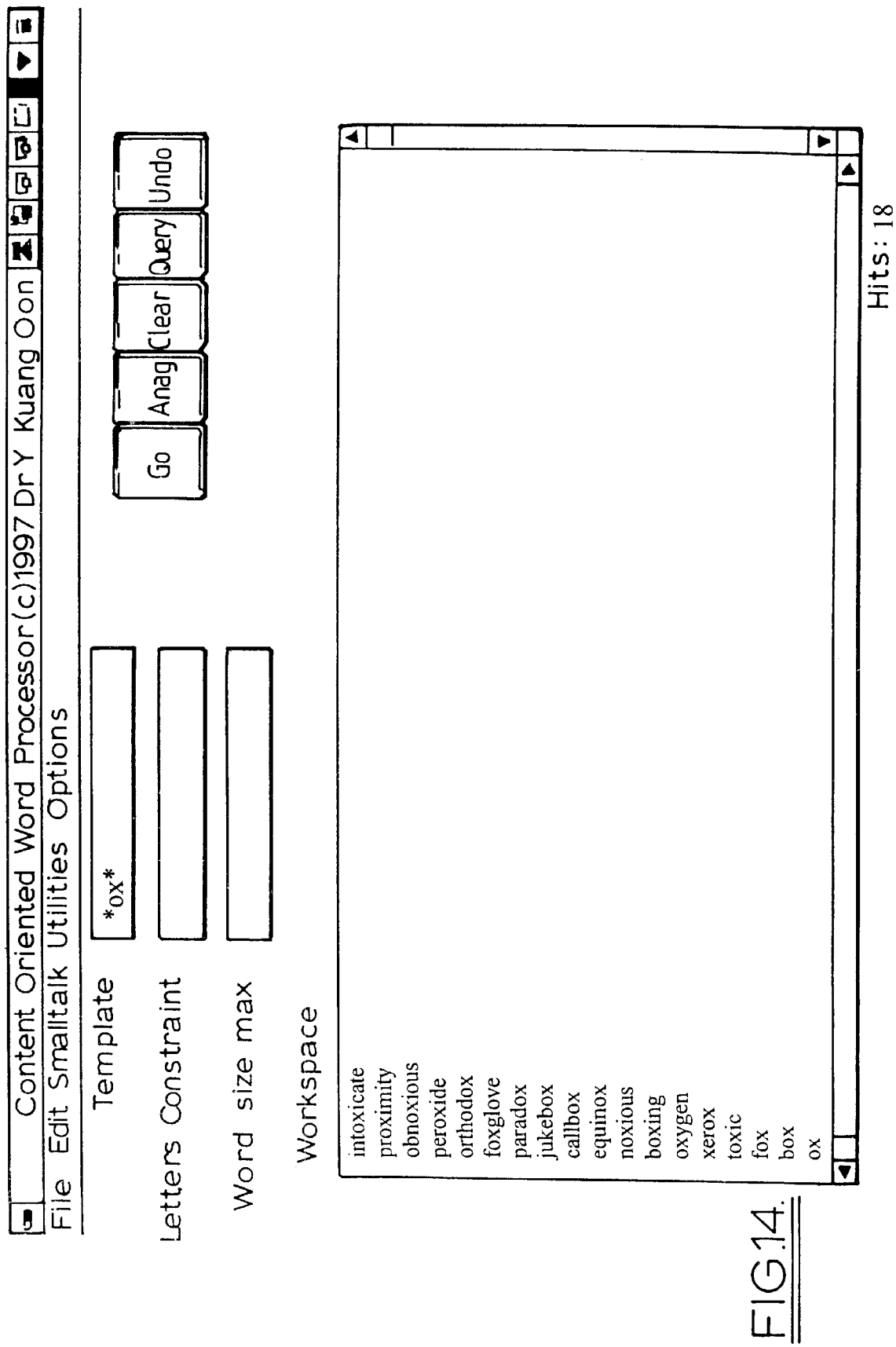
FIG. 14 is an exemplary GUI of a wild card match for a template according to the preferred embodiment of the present invention.

FIG. 14 Wild card match for template *ox*. This query results in 18 hits listing words from intoxicate to ox. List of onomatopoeia words, double and triple rhymes—onomatopoeia words are spelled in a way that closely reflect their meaning e.g. boom, bang and ding. These words can be easily retrieved by, using the wild character match e.g. *oom. Using the same method but by employing two*wildcards will retrieve double rhymes and three*will obtain list of triple rhymes.

E.g. Double rhymes: *oin*ted will yield jointed, pointed, disjointed, anointed and disappointed.

Triple rhymes: *i*i*fy will yield vilify and solidify.

Figure 15:
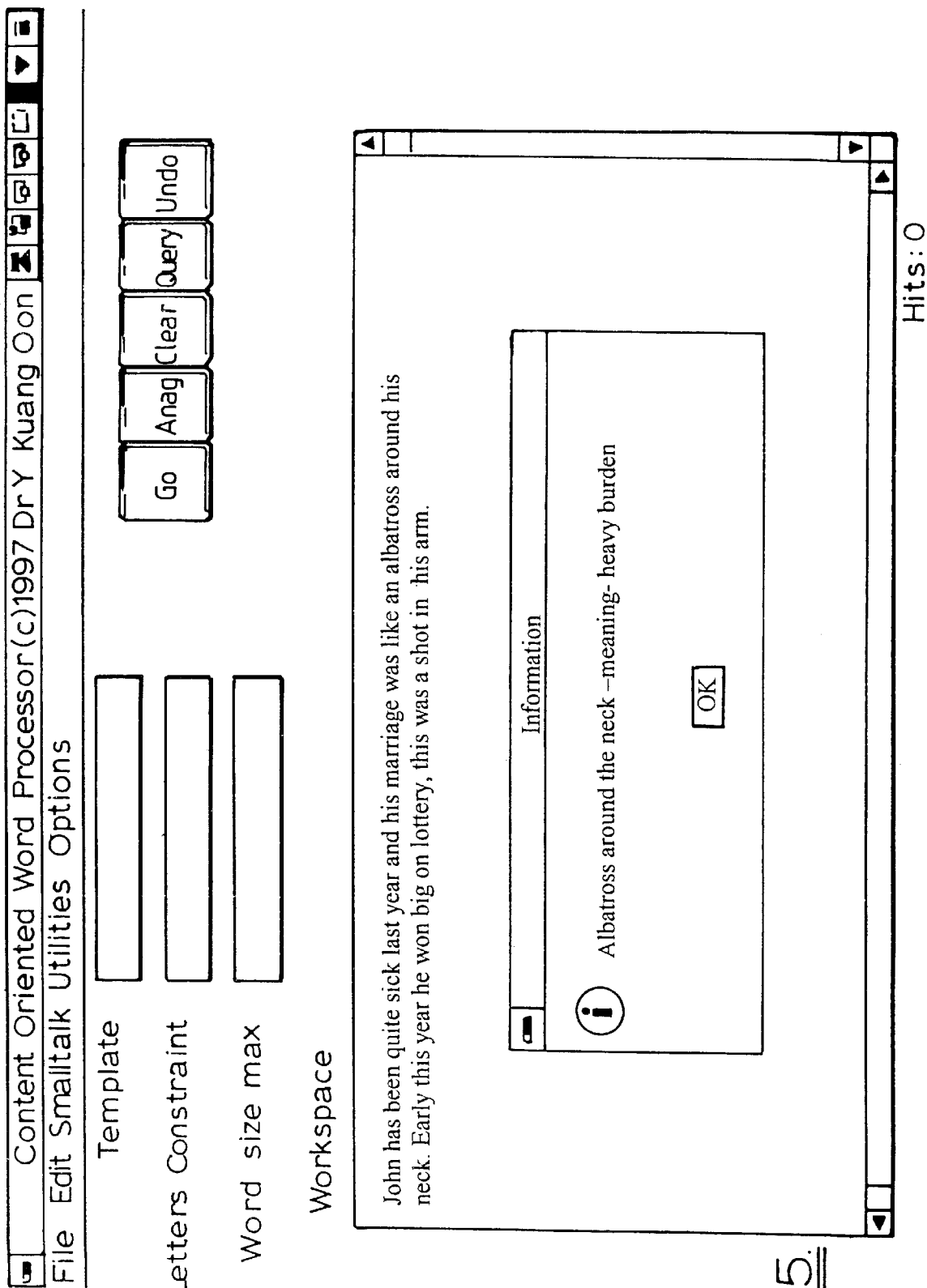
FIG. 15 is an exemplary GUI of a selected text being scanned for embedded idioms according to the preferred embodiment of the present invention.

FIG. 15 Shows the selected text being scanned for embedded idioms. There are two idioms embedded in text. The first is 'albatross round the neck', the second chunk of idiom is 'shot in the arm' which means to 'enthuse'.

Figure 16:
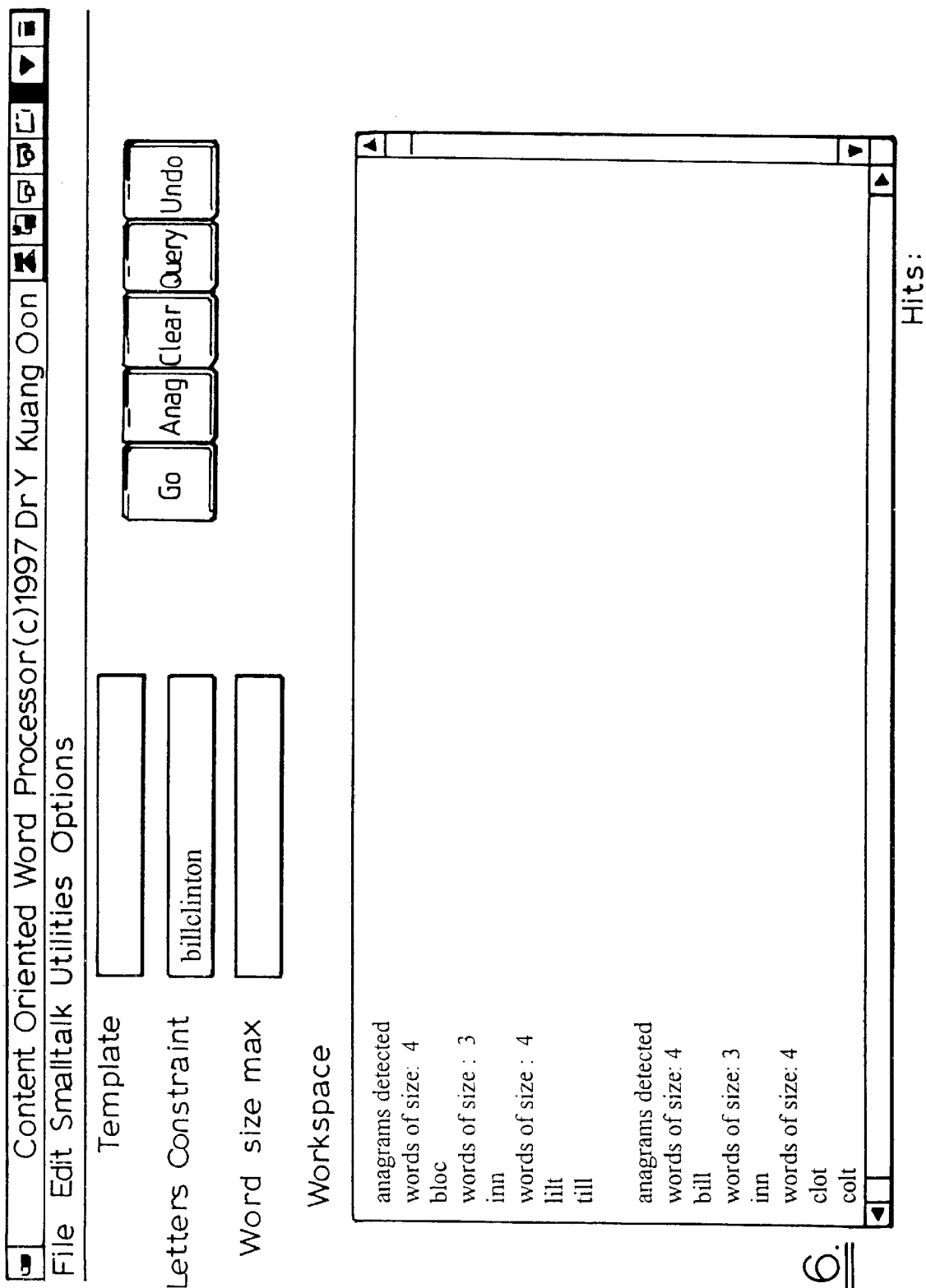
FIG. 16 is an exemplary GUI of anagrams being constructed from a text according to the preferred embodiment of the present invention.

FIG. 16 Anagram that can be constructed from letters constrained to 'billclinton' which results in anagrams such as colt 'inn bill' and 'inn till bloc'.

Figure 17:
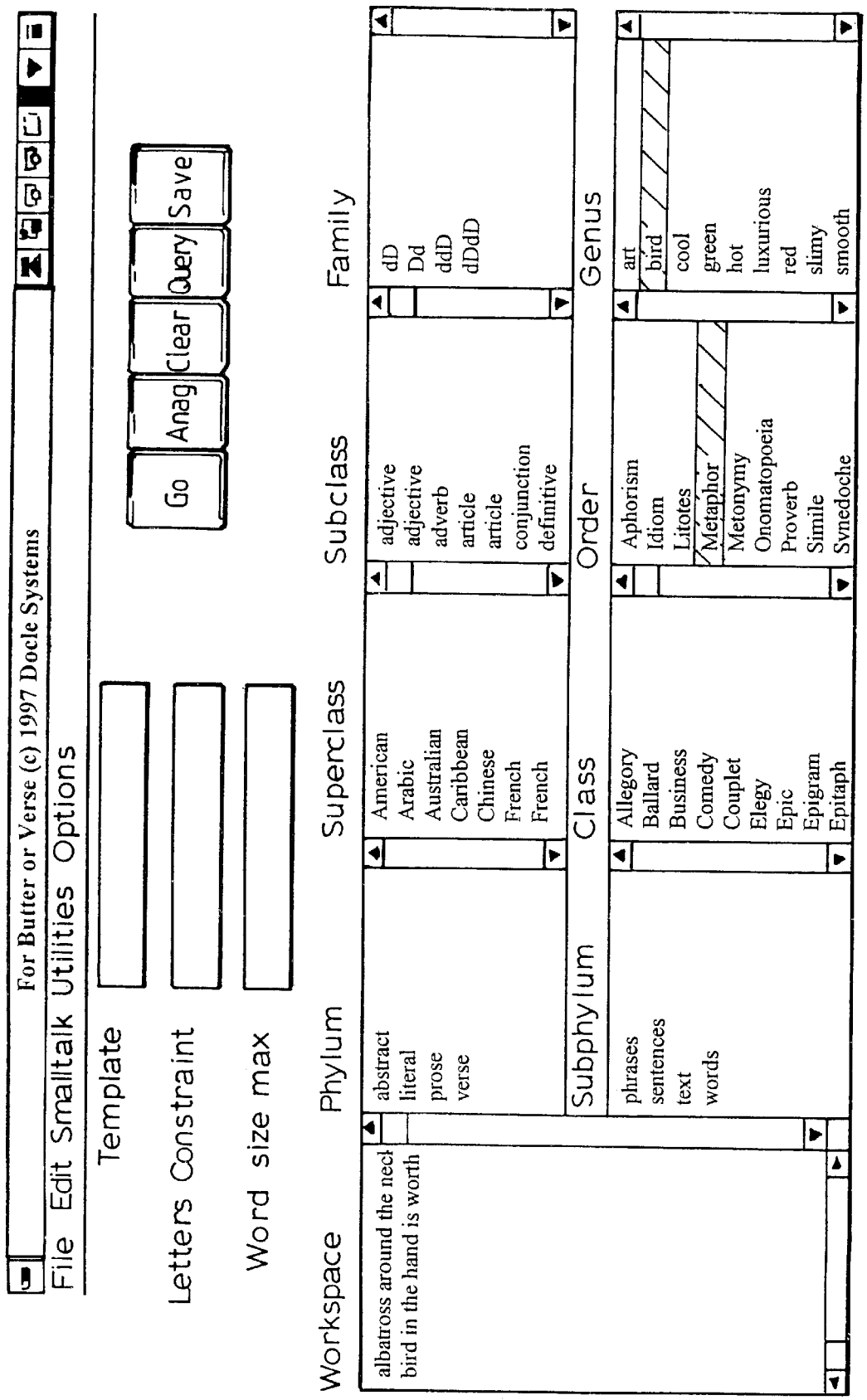
FIG. 17 is an exemplary GUI of a multi-value multilevel search according to the preferred embodiment of the present invention.

FIG. 17 Means for multivalue multilevel search—this search is based on the logical AND operation. In this example the Genus 'bird' and the Order metaphor are selected, the button Go is clicked and the results returned are: 1) albatross around the neck and 2) bird in the hand is worth two in the bush.

Another example the user might want to look for words with 'spider' as a Genus attribute. the search will list the following:

arachnophobia, tick, arachnid, tarantula, black widow, red back, web. The method of operation is the look up of the word in the lexicon, the instance variable called attribute is read for all the associated attributes.

The user might want to constrain her search for words that has the spider attribute and rhymes with 'id'.

In this instance the word 'arachnid' will be found.

Method of operation is based on two step process:
a) All words which ends with 'id' are put in a Collection.
b) Each word is checked for the correct attribute, if attribute fits, then output.

Because the belief system holds all words, phrases, sentences and text in one homogenous space, the possibilities are endless. Typical of an interesting method based on this belief system that may be useful to the marketing department is the ability to query the system with a query such as:

Start with the template: '*in' and give me words that have attribute spider. The belief system comes back with 'dancing' as tarantula is a spider and is also a dance form.

Another query would be to query the system with 2 attributes: I) dance and ii) spider and the answer would be 'tarantula'.

Another query would he to create random words from the letters constraint and select results to conform to certain rhyme pattern, conform to fixed Genus attributes only. This would be useful in the advertising industry where new words have to be invented.

Figure 18:
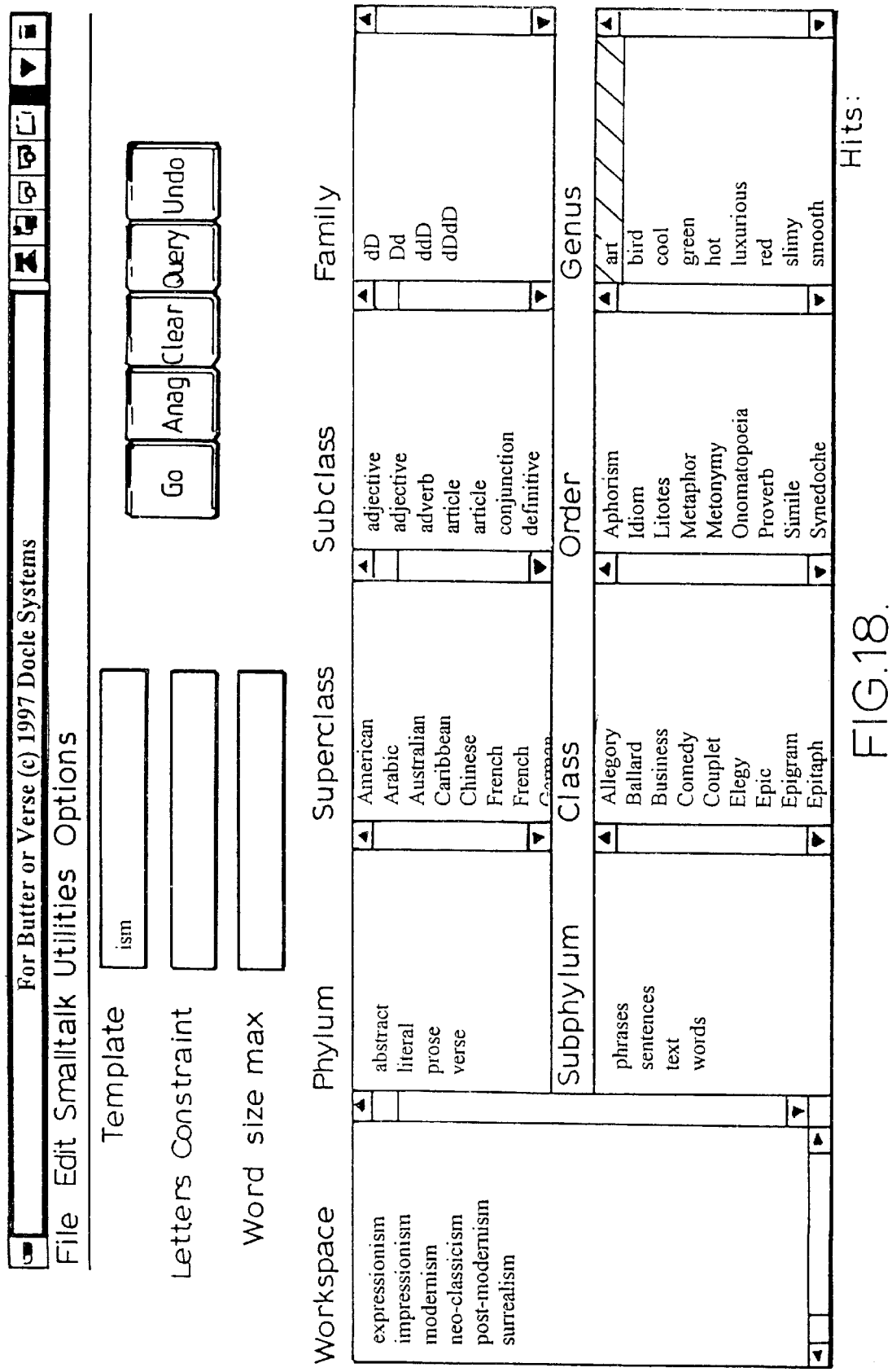
FIG. 18 is an exemplary GUI of a multi-value query according to the preferred embodiment of the present invention.

FIG. 18 A multi-value query based on the template '*ism' and the genus called 'art'. The results being a list comprising expressionism, impressionism, modernism, neo-classicism. post-modernism, surrealism.

Figure 19:
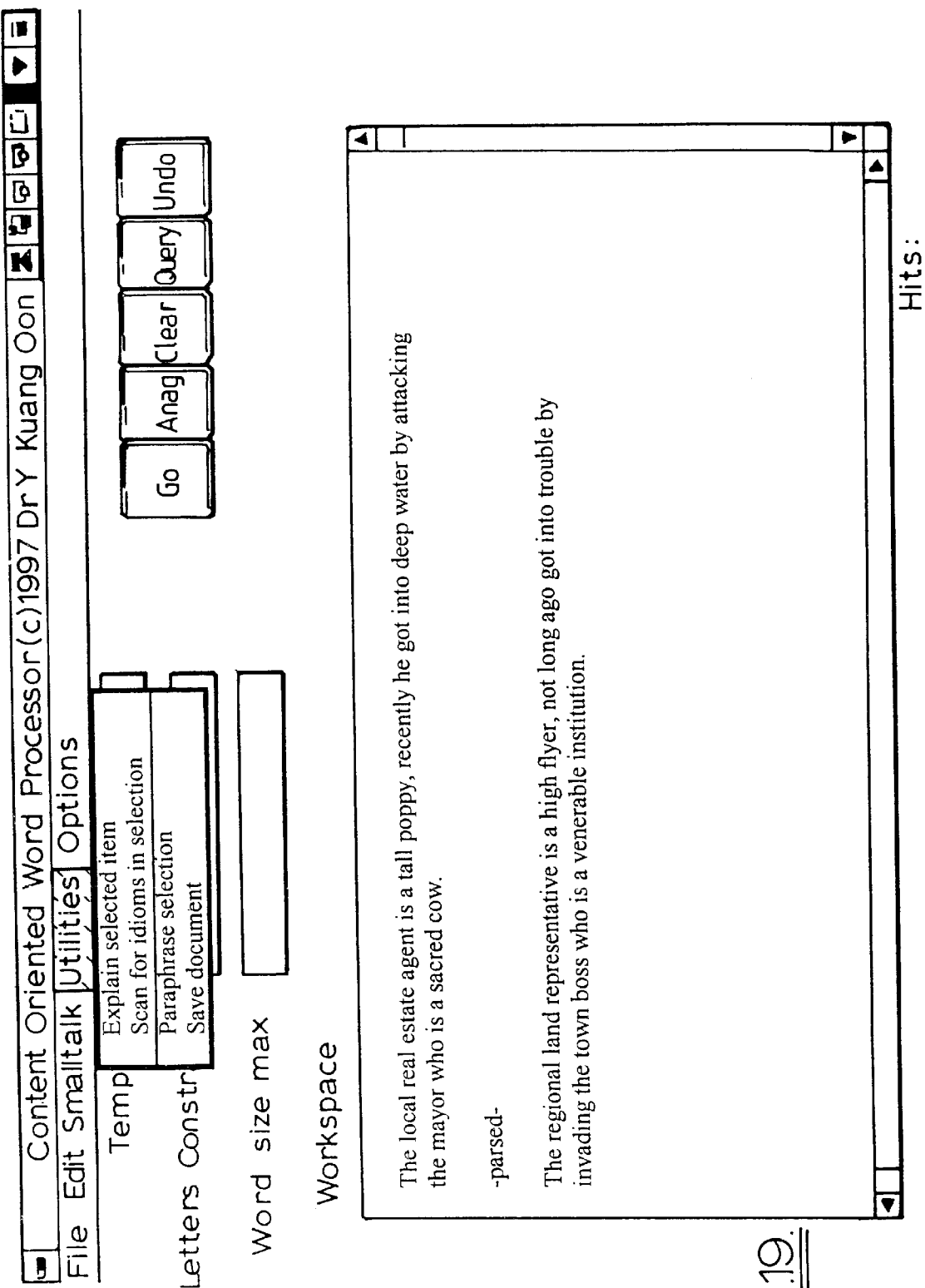
FIG. 19 is an exemplary GUI of the paraphrase function according to the preferred embodiment of the present invention.

FIG. 19 Paraphrase function—selected text will be scanned be hidden idiomatic expressions. These idiomatic expressions are extirpated and the literal meaning substituted. The remaining words are individually substituted by its alternate meaning. The paraphrase is assembled by concatenation of the alternate words with the interpretation of the idiom(s) found. The paraphrase is then outputted.

Figure 20:
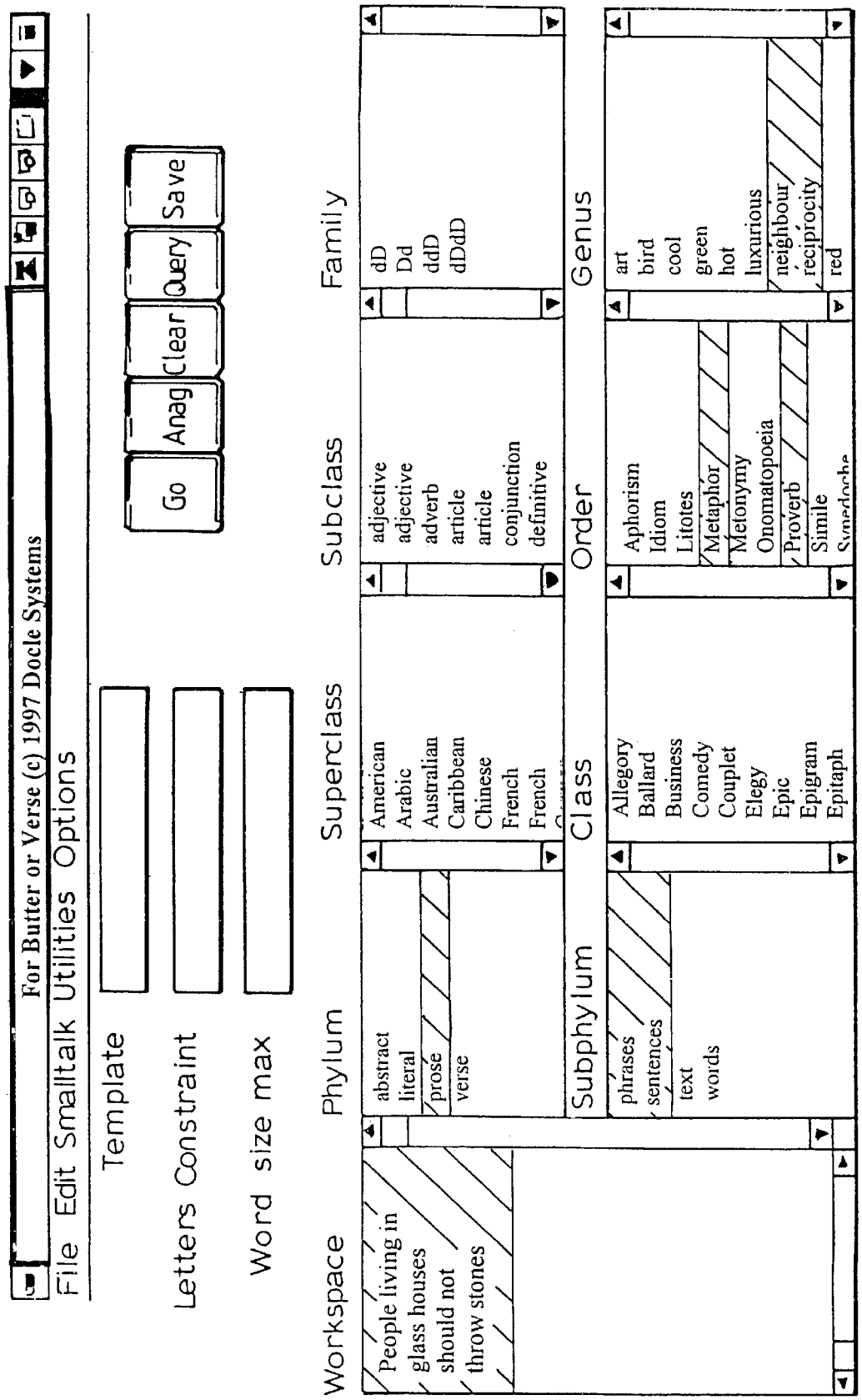
FIG. 20 is an exemplary GUI of the incremental logging of linguistic objects and augmentation of the belief system according to the preferred embodiment of the present invention.

FIG. 20 Means for incremental logging of linguistic objects and augmentation of the belief system.

When the user comes across a literary gem, which can be a word, phrase, sentence or text, he can edit and add the linguistic object that he considers may be of use in the future. In the future he man choose to amend or delete the same linguistic object from the belief system. The belief system spans single words to text chunks, hence it is possible to save and incorporate every document into the belief system. Every linguistic object saved will be classified as a species and mapped onto the linnean hierarchy for future access. The Genus attributes of the species will enable the linguistic object to be rapidly retrieved. The Genus attributes are automatically generated for the species by scansion of the word string. Words that occur infrequently are selected to he genus attributes. For example the proverb 'People living in glass houses should not throw, stones.'

The genus attributes would be: glass house stone.

The user can manually add more attributes, such as 'reciprocity' 'neighbour'. The Phylum, Subphylum, Superclass, Class, Subclass. Order, Family and Genus that the species belongs to can all be selected in the display before saving by clicking, on the 'Save' button. The system will prompt the user for missing information regarding missing data in the Linnean Record. The species record is updated and all the taxa data are activated and the added information is fully useful to the belief system and its methods. Note that the multi-inheritance features of the belief system allows the saying to be both a metaphor and a proverb. It is also a phrase or a sentence depending on the context.

For retrieval purposes, the user will be prompted for Genus attributes to retrieve the item from the belief system. For example the quotation by John Newbern 'People can be divided into three groups 1) those who make things happen 2) those who watched what happened and 3) those who wondered what happened'. The keywords will be Newbern, watch, make, wondered. To retrieve the sentence saved, the multi-list search window has a list pane labelled Genus attributes on the right side of the screen, clicking on any of the attributes and 'Go' button will produce a list of candidates in the word space pane. The entire belief system can also be linearly searched word by word.

Figure 21:
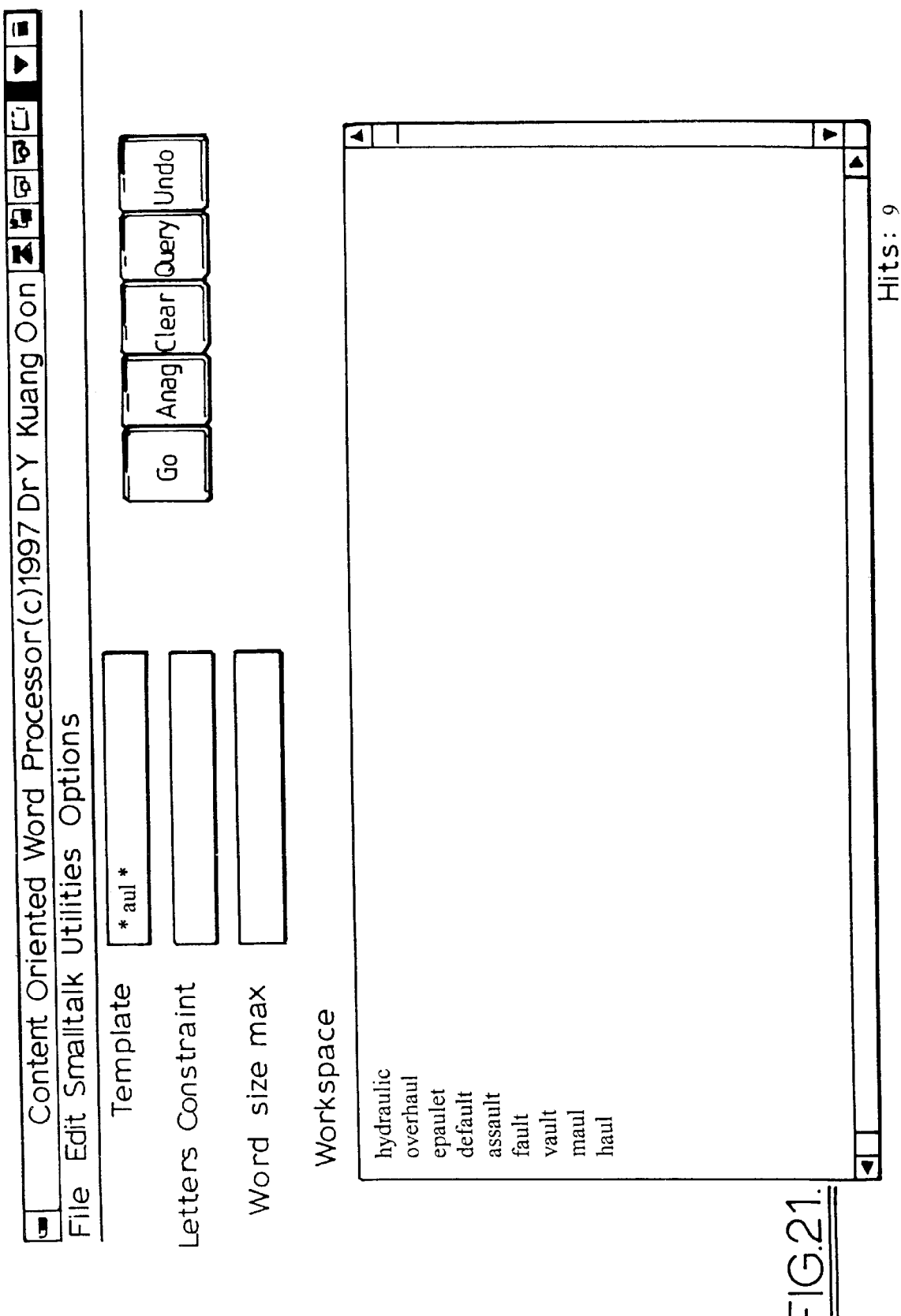
FIG. 21 is an exemplary GUI of a listing of all exact or slant (inexact) rhymes according to the preferred embodiment of the present invention.
Figure 22:
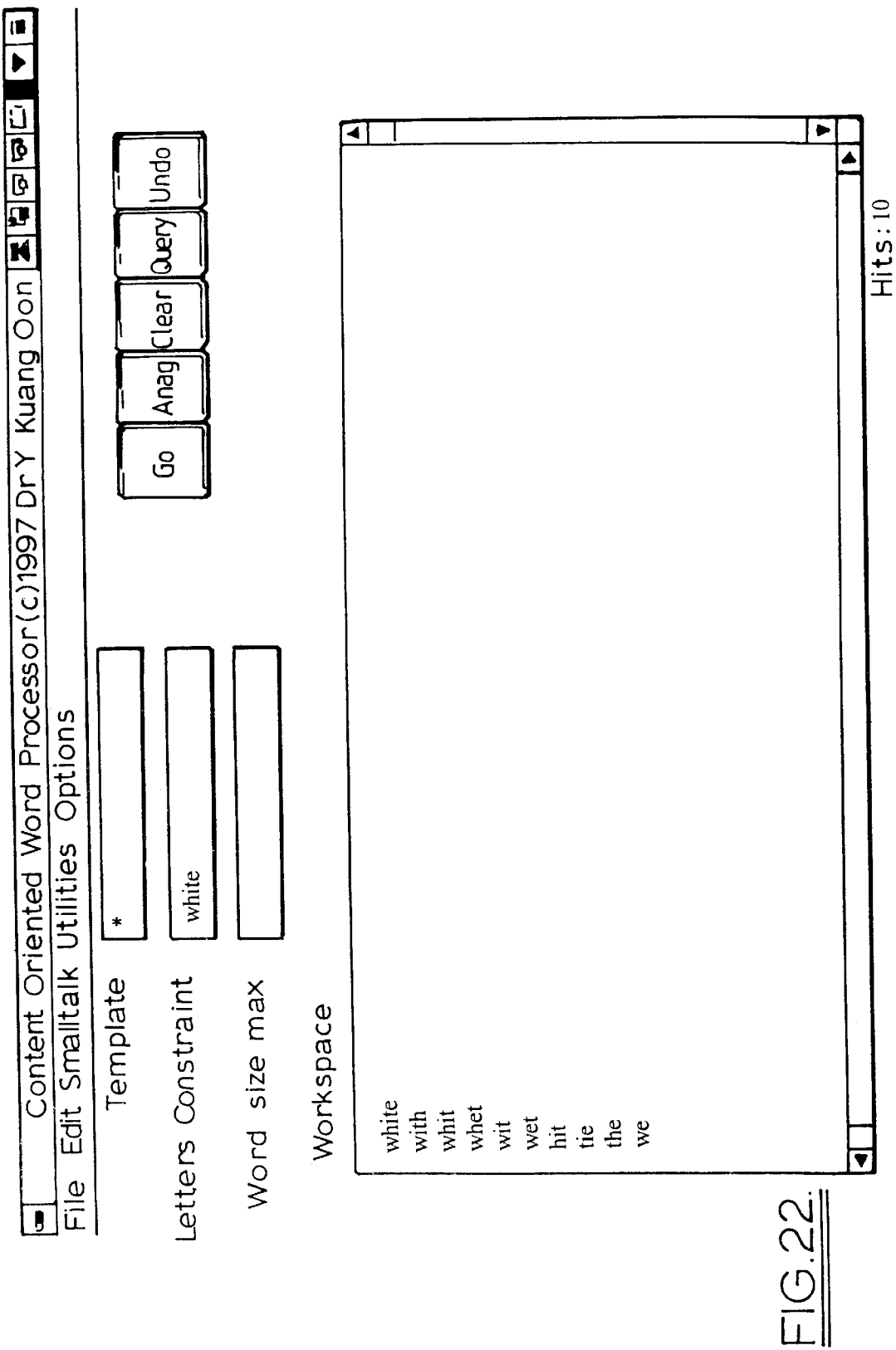
FIG. 22 is an exemplary GUI of the construction of a list of all single word derivatives according to the preferred embodiment of the present invention.

FIG. 21 Listing of all exact or slant (inexact) rhymes—the alliteration and assonance functions. In the template box a word is typed a string that rhymes with 'pauline'. Selecting show slant rhymes in the Utilities menu will cause for a match to any one of the following patterns:
pau paw aul awl lin ine yne lyn The inexact rhyme pattern generator accepts a string as input and outputs a collection of substrings all three character long. New patterns are generated by substituting y for i, w for u etc. This bag of generated search patterns are then subjected to an iterative loop and each pattern is matched as per exact rhyme method as shown in this figure. The exact internal and end rhyme to 'aul' collected 9 matches with the words listed on the workspace, FIG. 22 Construction of list of all single word derivatives—example the template * with the constraint string being 'white' will list the following terms—
white whit whet wit wet hit tie the we This function is useful for word games such as crossword puzzles and Scrabble. It helps build intimacy with the language.

Method of operation is by using the wildcard to generate all possible patterns with the maximum number of characters equal to the word constraint. Word patterns that are subsets of the constraint string are the successful candidates are listed.

Figure 23:
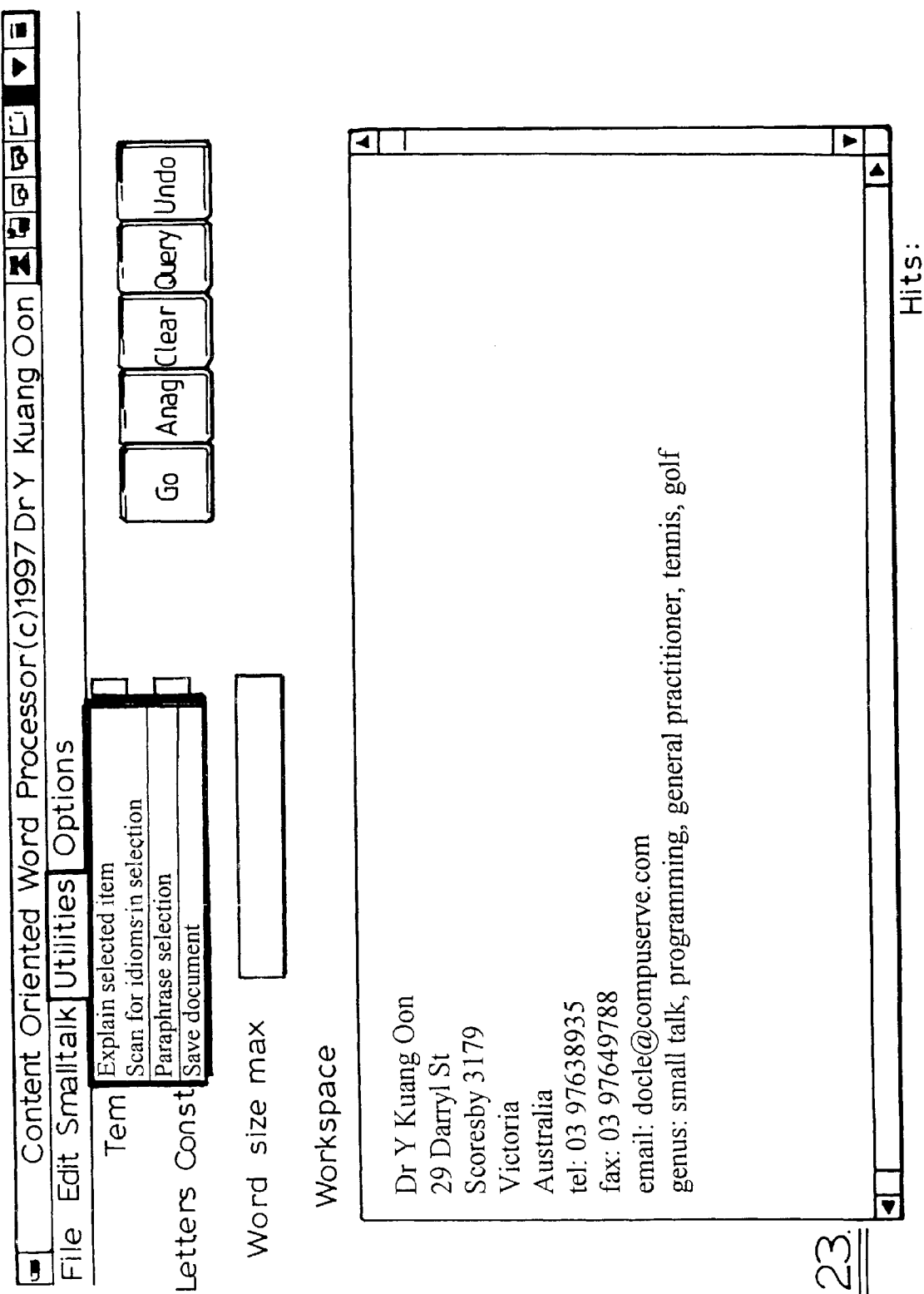
FIG. 23 is an exemplary GUI showing an address book typo record being marked for multiple key access according to the preferred embodiment of the present invention.

FIG. 23 Shows that the plasticity of the belief system can be put to good use to store data that is normally handled by a database program. In this example, this address book type record is marked for multiple key access in the future. The genus: keyword informs the belief system to save the attributes programming, smalltalk, general practitioner, tennis and golf in the Genus Dictionary in addition to the terms Kuang, Oon, Darryl, Scoresby, Victoria, Australia, and docle@compuserve.com.

Figure 24:
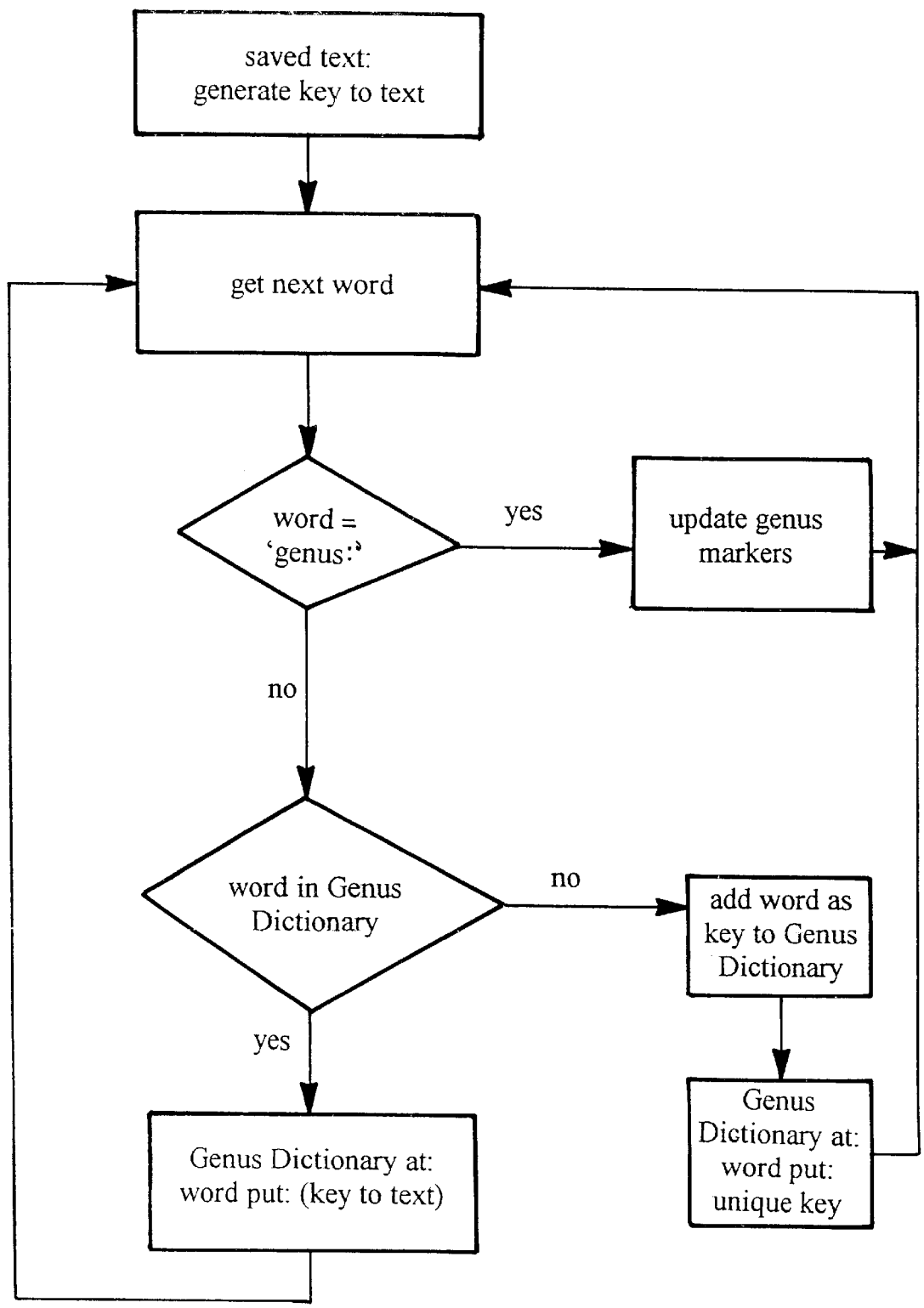
FIG. 24 is a flowchart of exemplary method steps taken by the application software to service the request to save the text in FIG. 23 according to the preferred embodiment of the present invention.

FIG. 24 Shows the steps taken by application software to service the request to save the text in FIG. 23. The special keyword is 'genus:' which informs the application to save the attributes after the keyword to be incorporated into the belief system, for ease of retrieval via multiple access keys at the genus level.

GLOSSARY AND DEFINITIONS OF WORDS AS USED IN THIS DOCUMENT alliteration—repeating consonant sounds among word neighbourhood
anapestic meter—rhythmic unit of type ddD e.g. Alor STAR
aphorism—a saying that encapsulates a general truth, maxim.
  E.g. More things are missed by not looking than by not knowing.
assonance—repeating vowel sounds among word neighbourhood
blank verse—unrhymed line of poetry with five iambs
exact rhyme—sounds exactly the same
expression—word or phrases
dactylic meter—rhythmic unit of type Ddd e.g. MUtiny
diction—choice of words, phrases, individual sentences, text
double rhyme—same two words rhyming at two locations
end rhymes—sound alike at end of sentence
expressions—defined as phrases and sentences only in this document.
feminine rhyme—rhyme involving two or more syllables, the first syllable is stressed, e.g.
pencil and stencil
free verse—line with no meter, no rhyme
haiku—Japanese poem with three lines, 5-7-5 syllables
idiom—figure of speech
iambic foot—rhythmic unit of type dD e.g. aRISE iambic pentameter—line with five iambic feet
light verse—humorous poems
litotes—a type of affirmative understatement—Brahms is not a bad composer.
masculine rhyme—rhyme on last syllable that is also stressed
meter—the measure of rhythm in a word or phrase based on patterns of accented and nonaccented syllables called metrical feet.
metaphor—figure of speech with implied comparison e.g. autumn of life.
metonymy—using a specific word to represent a wider concept
e.g.—the crown to mean royalty
metre—the repetition of the metrical pattern
metrical pattern—is the basic rhythmic unit based on stress or unstressed syllable e.g. COCHlear is Dd.
onomatopoeia—a word with its meaning associated with its sound
prose—unversified language
prosody—science of versification, study of metre
rhyme—sounds alike
sight rhyme—looks the same but sounds different e.g. fore/furore
simile—explicit comparison using words like 'as' and like
slant rhyme—inexact rhyme, faint to moderate similarity in sound alliteration and
assonance are aspects of slant rhyme.
e.g. greasy and dizzy
sonnet—a poem in fourteen lines
syllabic poem—verse constructed based on syllable count
synedoche—gives the part of a whole to represent the whole
e.g. the hand that signs the
paper to represent the signatory.
triple rhyme—same two words rhyming at three locations.
trochee—rhythmic unit of type Dd e.g. BANGer
verse—is versified language or poetry, there is metrical composition—synonymous with poetry It would be apparent to those skilled in the art that the method and system described above can be varied and altered without departing from the spirit of the invention. Such alterations and variations are understood to be included in the scope of the invention.

The claims defining the invention are as follows:

1. A method of implementing a didactic and content oriented word processor analysis of displayed text based upon a unified belief system of linguistic space, wherein elements of the linguistic space are classified into species and each element comprises one of words, phrases, individual sentences and text, the linguistic space being defined at a species level into a multilevel hierarchy with multiple inheritance, wherein each species is adapted to belong to one of no taxon and at least one taxon at any level of said hierarchy, the analysis involving the selection of at least one protocol selected from the group of at least one parsing and paraphrasing text protocol, at least one diction technique protocol, and at least one word puzzle solution protocol, the method comprising the steps of:
   (a) selecting text displayed upon a video display;
   (b) displaying on the video display at least one query box relating to at least one of the protocols and screens associated therewith;
   (c) selecting at least one of the protocols;
   (d) running the selected at least one protocol; and
   (e) displaying on the video display a text edit area adapted to receive the output of said step (d), wherein: the output of said step (d) is stored and integrated into the unified belief system.

2. The method of claim 1, wherein at least two protocols are selected in said step (c).

3. The method of claim 1, further comprising the step of editing the selected text in response to the output of said step (d).

4. The method of claim 1, wherein said multilevel hierarchy is based on the Linnean biological model, with a single taxon at the level of kingdom and taxa at the levels of phylum, subphylum, superclass, class, subclass, order, family, genus, subgenus, superspecies and species.

5. The method of claim 4, wherein the hierarchy comprises further levels selected from the group of subclass, suborder, subfamily and subspecies.

6. The method of claim 4, wherein, moving down the Linnean hierarchy, there is a general decrease in size of the taxa.

7. The method of claim 4, wherein any linguistic element comprising one of words, phrases, individual sentences and text is classified into hierarchies with following taxa:
   LEVEL: TAXA SELECTED FROM THE GROUP INCLUDING:
   KINGDOM LEVEL: Word
   PHYLUM LEVEL: Literal, Abstract, Verse, Prose
   SUBPHYLUM: Words, Phrases, Sentences and Text
   SUPERCLASS: International, English, American, Australia, Singaporean, South African, New Zealand, Caribbean, French, German, Latin, Greek, other language
   CLASS: Ballad, Couplet, Epigram, Epitaph, Haiku, Soliloquy, Sonnet, limerick, Allegory, Elegy, Comedy, Epic, Parody, Narrative, Occasional, Satire, Tragedy, Essay, Letter, Romance, Legalese, Professional, Business, Social, Speech
   SUBCLASS: noun, pronoun, verb transitive, verb intransitive, adjective, adverb, preposition, indefinite article, definitive article, conjunction, interjection, participial adjective, plural, past participle, preterite
   ORDER: Metaphor, Aphorism, Proverb, Litote, Simile, Onomatopoeia, Idiom
   FAMILY: iambic, anapestic, dactylic, trochaic and combinations thereof
   GENUS: attributes, qualitative association
   SUBGENUS: The original term in Latin, Greek, Old English, Middle English, French, German, other language origin
   SUPERSPECIES: the root word
   SPECIES: The word, or phrase, or sentence or text itself; and fields for synonym, antonym, literal meaning, abstract meaning and pronunciation.

8. The method of claim 1, wherein running the at least one protocol that was selected from the group of at least one protocol for parsing and paraphrasing text, at least one protocol for translating idioms to their literal meaning and at least one diction technique protocol enables the generation of a list of words or phrases corresponding to the selected text.

9. The method of claim 1, wherein the group from which the at least one protocol is selected further comprises at least one pronunciation protocol, providing means for speech technology input and output.

10. The method of claim 1, wherein the group from which the at least one protocol is selected further comprises at least one protocol to determine the literal meaning of at least one of an embedded idiom and an embedded metaphor within the selected text.

11. The method of claim 1, wherein the group from which the at least one protocol is selected further comprises at least one protocol to determine the selected text in a paraphrase form corrected for any embedded idioms.

12. The method of claim 1, wherein at said step (a) the selected text is a single word and the group from which at least one protocol is selected further comprises a protocol to determine a metrical analysis of the word.

13. The method of claim 1, wherein the output of step (d) is used as a text document input.

14. A text object classification method for use in a word processor system for classifying each of a plurality of selected text objects into a predetermined classification, the classification method being based upon a unified belief system of linguistic space, elements of the linguistic space elements being organized into species and comprising one of a word, phrase, individual sentence and text, the linguistic space being defined at a species level into a multilevel hierarchy with multiple inheritance, and wherein each species is adapted to belong to one of no taxon and at least one taxa at any level of said hierarchy, said method comprising:

storing each of said plurality of text objects;

storing at each species level in said hierarchy, for each of said plurality of text objects, data representing a distinguishing characteristic of the each text object in respect of the taxa at the each species level;

arranging said stored data in the form of a look-up table accessible to a word processor user carrying out text analysis involving the selection of at least one protocol selected from the group of at least one parsing and paraphrasing test protocol, at least one diction technique protocol, and at least one word puzzle solution protocol; and repeating said storing and arranging steps for each of said plurality of text objects.

* * * * *